US012706707B2

(12) United States Patent
Dallal et al.

(10) Patent No.: US 12,706,707 B2
(45) Date of Patent: Aug. 11, 2026

(54) BEAM CONTROL TECHNIQUES FOR A TRANSPARENT REPEATER

(71) Applicant: QUALCOMM Incorporated, San Diego, CA (US)

(72) Inventors: Yehonatan Dallal, Kfar Saba (IL); Amit Bar-Or Tillinger, Tel-Aviv (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 17/944,703

(22) Filed: Sep. 14, 2022

(65) Prior Publication Data

US 2024/0089039 A1 Mar. 14, 2024

(51) Int. Cl.

*H04L 5/00* (2006.01)
*H04W 72/20* (2023.01)
*H04W 88/04* (2009.01)

(52) U.S. Cl.

CPC ........... *H04L 5/0023* (2013.01); *H04W 72/20* (2023.01); *H04W 88/04* (2013.01)

(58) Field of Classification Search

CPC .... H04L 5/0023; H04L 5/0051; H04W 72/20; H04W 88/04; H04W 74/0833; H04W 72/23; H04W 76/18; H04W 16/28; H04W 84/047; H04B 7/0695; H04B 7/15528

See application file for complete search history.

(56) References Cited

U.S. PATENT DOCUMENTS

| | | | | |
|---|---|---|---|---|
| 10,880,895 | B2 * | 12/2020 | Gordaychik | H04L 1/1854 |
| 11,375,527 | B1 * | 6/2022 | Eyuboglu | H04B 7/15528 |
| 11,881,928 | B2 * | 1/2024 | Gineste | H04B 7/18547 |
| 2019/0254013 | A1 * | 8/2019 | Chang | H04L 5/00 |
| 2019/0349960 | A1 * | 11/2019 | Li | H04L 1/1861 |
| 2020/0053670 | A1 * | 2/2020 | Jung | H04W 56/0015 |
| 2020/0053724 | A1 * | 2/2020 | MolavianJazi | H04W 52/146 |
| 2020/0337083 | A1 * | 10/2020 | Loehr | H04W 72/1263 |
| 2021/0021536 | A1 * | 1/2021 | Ganesan | H04L 47/56 |
| 2021/0120529 | A1 * | 4/2021 | Park | H04W 72/0446 |
| 2022/0272706 | A1 * | 8/2022 | Sengupta | H04W 52/18 |
| 2023/0188194 | A1 * | 6/2023 | Geren | H04W 76/14 375/262 |
| 2023/0333256 | A1 * | 10/2023 | Fujii | G01S 13/762 |
| 2024/0204859 | A1 * | 6/2024 | Kataoka | H04B 7/0413 |
| 2024/0429994 | A1 * | 12/2024 | Moon | H04W 16/26 |
| 2025/0233653 | A1 * | 7/2025 | Shimoda | H04B 7/208 |

FOREIGN PATENT DOCUMENTS

CN 115553033 A * 12/2022 .......... H04L 5/0044

* cited by examiner

*Primary Examiner* — Atique Ahmed
(74) *Attorney, Agent, or Firm* — Holland & Hart LLP

(57) ABSTRACT

Methods, systems, and devices for wireless communications are described. A repeater device may transmit, to a network entity, a control message indicating a set of beams of the repeater device. The repeater device may receive, from the network entity, a signal within a time slot indicating a first beam of the set of beams. The repeater device may relay, via the first beam, a data message from the network entity to a user equipment (UE) associated with the first beam within the time slot based on the signal.

25 Claims, 18 Drawing Sheets

BEAM CONTROL TECHNIQUES FOR A TRANSPARENT REPEATER

FIELD OF TECHNOLOGY

The following relates to wireless communications, including beam control techniques for a transparent repeater.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam control techniques for a transparent repeater. For example, the described techniques provide for fast beam switching at a repeater device that is configured to relay signaling between a network entity and a user equipment (UE). A network entity may transmit a signal including a sequence which corresponds to a beam direction or beam for an upcoming data transmission. A repeater device may receive the signal to identify a beam for the data transmission and relay the data transmission using the identified beam associated with the signal. The network entity may transmit control signaling to configure the repeater with an association or mapping between different sequences of the signal and beams of the repeater. In some cases, the signal may be frequency division multiplexed with a downlink control information message scheduling the data transmission. The repeater device may relay the downlink control information message using a wide beam. In some examples, the network entity may schedule the data transmission in accordance with a beam switching capability of the repeater device. For example, the data transmission may be scheduled a quantity of symbol periods after the downlink control information message in accordance with the beam switching capability. In some examples, the network entity may transmit the sequence as a preamble or a physical header for the slot. The network entity may receive a downlink control information message scheduling the data message and relay the downlink data message using a beam associated with the preamble sequence.

A method for wireless communications at a repeater device is described. The method may include transmitting, to a network entity, a control message indicating a set of multiple beams of the repeater device, receiving, from the network entity, a signal within a time slot indicating a first beam of the set of multiple beams, and relaying, via the first beam, a data message from the network entity to a UE associated with the first beam within the time slot based on the signal.

An apparatus for wireless communications at a repeater device is described. The apparatus may include a processor, memory coupled with the processor, and instructions stored in the memory. The instructions may be executable by the processor to cause the apparatus to transmit, to a network entity, a control message indicating a set of multiple beams of the repeater device, receive, from the network entity, a signal within a time slot indicating a first beam of the set of multiple beams, and relay, via the first beam, a data message from the network entity to a UE associated with the first beam within the time slot based on the signal.

Another apparatus for wireless communications at a repeater device is described. The apparatus may include means for transmitting, to a network entity, a control message indicating a set of multiple beams of the repeater device, means for receiving, from the network entity, a signal within a time slot indicating a first beam of the set of multiple beams, and means for relaying, via the first beam, a data message from the network entity to a UE associated with the first beam within the time slot based on the signal.

A non-transitory computer-readable medium storing code for wireless communications at a repeater device is described. The code may include instructions executable by a processor to transmit, to a network entity, a control message indicating a set of multiple beams of the repeater device, receive, from the network entity, a signal within a time slot indicating a first beam of the set of multiple beams, and relay, via the first beam, a data message from the network entity to a UE associated with the first beam within the time slot based on the signal.

Some examples of the method, apparatuses, and non-transitory computer-readable medium described herein may further include operations, features, means, or instructions for receiving a second control message indicating a set of multiple sequences, where each sequence of the set of multiple sequences corresponds to a different beam of the set of multiple beams, where the data message is relayed via the first beam based on the second control message.

Some examples of the method, apparatuses, and non-transitory computer-readable medium described herein may further include operations, features, means, or instructions for switching to the first beam of the set of multiple beams based on the signal including a first sequence of the set of multiple sequences that corresponds to the first beam.

In some examples of the method, apparatuses, and non-transitory computer-readable medium described herein, receiving the second control message may include operations, features, means, or instructions for receiving the second control message indicating a mapping between the set of multiple sequences and a set of multiple indexes for the set of multiple beams where the data message is relayed via the first beam based on the mapping.

Some examples of the method, apparatuses, and non-transitory computer-readable medium described herein may further include operations, features, means, or instructions for switching to the first beam corresponding to a beam index mapped to a first sequence of the set of multiple sequences based on the signal including the first sequence and the second control message indicating the mapping.

In some examples of the method, apparatuses, and non-transitory computer-readable medium described herein, relaying, from the network entity to the UE via a wide beam, a downlink control information message scheduling the data message.

In some examples of the method, apparatuses, and non-transitory computer-readable medium described herein, the downlink control information message may be frequency domain multiplexed with the signal.

Some examples of the method, apparatuses, and non-transitory computer-readable medium described herein may further include operations, features, means, or instructions for communicating one or more messages using a second beam of the set of multiple beams and switching from the second beam to the first beam based on the signal.

In some examples of the method, apparatuses, and non-transitory computer-readable medium described herein, relaying the data message may include operations, features, means, or instructions for receiving the data message from the network entity and transmitting the data message to the UE after a beam switch time gap.

In some examples of the method, apparatuses, and non-transitory computer-readable medium described herein, the signal includes a preamble sequence associated with the first beam of the set of multiple beams, where the data message may be transmitted using the first beam based on the preamble sequence.

In some examples of the method, apparatuses, and non-transitory computer-readable medium described herein, the signal may be included in a downlink control information message scheduling the data message.

In some examples of the method, apparatuses, and non-transitory computer-readable medium described herein, the control message indicates a mapping between a set of multiple UEs and the set of multiple beams, where the signal may be based on the mapping.

In some examples of the method, apparatuses, and non-transitory computer-readable medium described herein, the control message indicates a capability of the repeater device to relay signaling with low latency.

In some examples of the method, apparatuses, and non-transitory computer-readable medium described herein, the capability of the repeater device includes a quantity of beams supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

Some examples of the method, apparatuses, and non-transitory computer-readable medium described herein may further include operations, features, means, or instructions for receiving a second control message indicating a mapping between a set of multiple sequences and a set of multiple UE identifiers for a set of multiple UEs and transmitting the data message via the first beam serving the UE with a UE identifier mapped to a sequence included with the signal.

Some examples of the method, apparatuses, and non-transitory computer-readable medium described herein may further include operations, features, means, or instructions for transmitting a message indicating that a quantity of supported beams at the repeater device exceeds a quantity of configured beams at the repeater device, where the second control message may be received in response to the message.

In some examples of the method, apparatuses, and non-transitory computer-readable medium described herein, the signal includes a sequence corresponding to the first beam, where the sequence is a Zadoff-Chu sequence, a Walsh code, a Gold sequence, or any combination thereof.

A method for wireless communications at a network entity is described. The method may include receiving, from a repeater device, a control message indicating a set of multiple beams of the repeater device, transmitting, to the repeater device, a signal within a time slot indicating a first beam of the set of multiple beams, and transmitting, to the repeater device in accordance with a beam switch time gap of the repeater device, a data message for a UE associated with the first beam within the time slot based on the signal.

An apparatus for wireless communications at a network entity is described. The apparatus may include a processor, memory coupled with the processor, and instructions stored in the memory. The instructions may be executable by the processor to cause the apparatus to receive, from a repeater device, a control message indicating a set of multiple beams of the repeater device, transmit, to the repeater device, a signal within a time slot indicating a first beam of the set of multiple beams, and transmit, to the repeater device in accordance with a beam switch time gap of the repeater device, a data message for a UE associated with the first beam within the time slot based on the signal.

Another apparatus for wireless communications at a network entity is described. The apparatus may include means for receiving, from a repeater device, a control message indicating a set of multiple beams of the repeater device, means for transmitting, to the repeater device, a signal within a time slot indicating a first beam of the set of multiple beams, and means for transmitting, to the repeater device in accordance with a beam switch time gap of the repeater device, a data message for a UE associated with the first beam within the time slot based on the signal.

A non-transitory computer-readable medium storing code for wireless communications at a network entity is described. The code may include instructions executable by a processor to receive, from a repeater device, a control message indicating a set of multiple beams of the repeater device, transmit, to the repeater device, a signal within a time slot indicating a first beam of the set of multiple beams, and transmit, to the repeater device in accordance with a beam switch time gap of the repeater device, a data message for a UE associated with the first beam within the time slot based on the signal.

Some examples of the method, apparatuses, and non-transitory computer-readable medium described herein may further include operations, features, means, or instructions for transmitting a second control message indicating a set of multiple sequences, where each sequence of the set of multiple sequences corresponds to a different beam of the set of multiple beams, where a sequence of the set of multiple sequences included with the signal corresponds to the first beam of the set of multiple beams.

In some examples of the method, apparatuses, and non-transitory computer-readable medium described herein, the signal includes a first sequence of the set of multiple sequences, and the first sequence corresponds to the first beam.

In some examples of the method, apparatuses, and non-transitory computer-readable medium described herein, transmitting the second control message may include operations, features, means, or instructions for transmitting the second control message indicating a mapping between the set of multiple sequences and a set of multiple indexes for the set of multiple beams, and a sequence of the set of multiple sequences included with the signal corresponds to a beam index for the first beam.

Some examples of the method, apparatuses, and non-transitory computer-readable medium described herein may further include operations, features, means, or instructions for transmitting, to the repeater device, a downlink control information message scheduling the data message.

In some examples of the method, apparatuses, and non-transitory computer-readable medium described herein, the downlink control information message may be frequency domain multiplexed with the signal.

In some examples of the method, apparatuses, and non-transitory computer-readable medium described herein, the signal includes a preamble sequence associated with the first beam of the set of multiple beams, where the data message may be transmitted using the first beam based on the preamble sequence.

In some examples of the method, apparatuses, and non-transitory computer-readable medium described herein, the signal may be included in a downlink control information message scheduling the data message.

In some examples of the method, apparatuses, and non-transitory computer-readable medium described herein, the control message indicates a mapping between a set of multiple UEs and the set of multiple beams, where the signal may be based on the mapping.

In some examples of the method, apparatuses, and non-transitory computer-readable medium described herein, the control message indicates a capability of the repeater device to relay signaling with low latency.

In some examples of the method, apparatuses, and non-transitory computer-readable medium described herein, the capability of the repeater device includes a quantity of beam supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

Some examples of the method, apparatuses, and non-transitory computer-readable medium described herein may further include operations, features, means, or instructions for transmitting a second control message indicating a mapping between a set of multiple sequences and a set of multiple UE identifiers for a set of multiple UEs.

Some examples of the method, apparatuses, and non-transitory computer-readable medium described herein may further include operations, features, means, or instructions for receiving a message indicating that a quantity of supported beams at the repeater device exceeds a quantity of configured beams at the repeater device, where the second control message may be received in response to the message.

DETAILED DESCRIPTION

Figure 1:
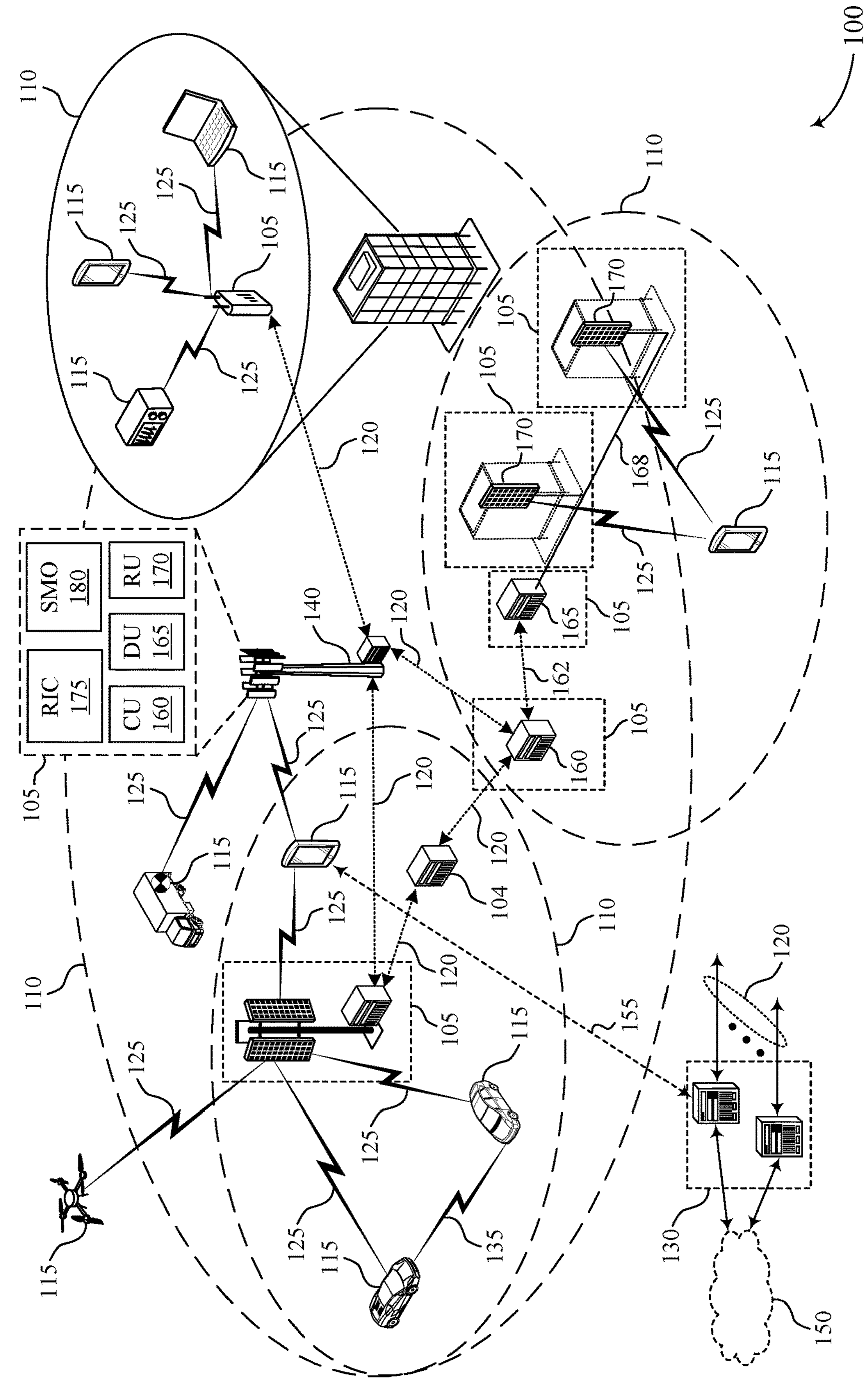
FIG. 1 illustrates an example of a wireless communications system that supports beam control techniques for a transparent repeater in accordance with one or more aspects of the present disclosure.

Some wireless communications systems may include a repeater device to relay signaling between a user equipment (UE) and a network entity. The repeater device may support beamformed signaling, redirecting signaling from a network entity to a UE using narrow beams. However, these beams may not be directly controlled by the network entity, thereby increasing complexity of beam management. In some cases, the network entity may be aware of UEs served by the repeater device and be aware of which beams of the repeater device serve the different UEs. In some of these systems, downlink control information may schedule downlink data within the same slot. The downlink control information may be decoded by all UEs served by the repeater device, while the downlink data may be redirected using a narrow beam. This may lead to tight timelines for the repeater device to both relay the downlink control information and switch beams to relay the downlink data using a narrow beam. Additionally, the repeater may have limited information on which UEs correspond to different beams. While the network entity may transmit a data message to the repeater device, the repeater device may not know to which beam or direction the data message is to be transmitted.

Wireless communications described herein support beam management techniques while implementing a repeater device. A network entity may transmit a signal including a sequence which corresponds to a beam direction or beam for an upcoming data transmission. A repeater device may receive the signal and relay the data transmission using an associated beam. The network entity may transmit control signaling to configure the repeater with an association or mapping between sequences and beams. In some cases, the signal may be frequency division multiplexed with a downlink control information message scheduling the data transmission. The repeater device may relay the downlink control information message using a wide beam. In some examples, the network entity may schedule the data transmission in accordance with a beam switching capability of the repeater device. For example, the data transmission may be scheduled a quantity of symbol periods after the downlink control information message in accordance with the beam switching capability. In some examples, the network entity may transmit the signal as a preamble or a physical header including a sequence corresponding to one of the beams. The network entity may receive the downlink control information message scheduling a downlink data message and relay the downlink data message on a beam associated with the preamble sequence.

Such implementations of the subject matter described in this disclosure can also be implemented to realize one or more of the following potential advantages. For example, in accordance with receiving, from a network entity, a signal within a slot indicating a beam for a data message, a repeater device may relay the data message via the beam within the slot to provide low latency relaying with directional beamforming gain. Additionally, these techniques may provide low-latency signaling for the network entity using the repeater device (e.g., for a line-of-sight channel), as the network entity may transmit, within the slot, the signal and the data message for the UE.

Additionally, the repeater device may relay downlink control information using a wide beam, ensuring that each UE served by the repeater device receives the downlink control information and has sufficient time to prepare for data reception, relaxing processing time at the UEs and improving reception reliability. These techniques may improve reliability and signal quality for systems implementing the repeater device. For example, the repeater device may transmit a downlink control information message using a wide beam before the repeater device switches to a directional beam, which may have higher reliability for the downlink control information message. The repeater device may change to a narrower, directional beam for downlink data signaling, which may have a higher signal-to-noise ratio (SNR). Additionally, the repeater device may receive uplink control signaling including, for example, acknowledgment feedback from several UEs using a wide beam, then the repeater device may change to a narrower directional beam to receive uplink data signaling with a higher SNR. These techniques may improve coverage from the repeater device by supporting a greater quantity of UEs with beamformed signaling.

Aspects of the disclosure are initially described in the context of wireless communications systems. Aspects of the disclosure are further illustrated by and described with reference to apparatus diagrams, system diagrams, and flowcharts that relate to beam control techniques for a transparent repeater.

FIG. 1 illustrates an example of a wireless communications system 100 that supports beam control techniques for a transparent repeater in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam control techniques for a transparent repeater as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)). In some examples, a time slot may refer to one or more TTIs, subframes, slots, or any combination thereof.

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170)

may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, such as NR systems and sub-Terahertz communications systems, a line-of-sight channel may be used to provide coverage and high throughputs. If a UE 115 is indoors or otherwise in an environment with many obstructions, a line-of-sight channel may be difficult to find directly between the UE 115 and a network entity 105. Therefore, some systems may use additional devices, such as repeater devices, repeaters, relays, femto-cells, or reconfigurable intelligent surfaces to establish a line-of-sight connection between the UE and the repeater device. These repeater devices may maintain low latency relaying such that the UE channel delay spread does not surpass a cyclic prefix length, cover a spatial area (e.g., a room inside of a building), and support communication to multiple UEs. In some examples, the repeater device may support a transparent beam management procedure, where beam management at the repeater is transparent to a serving cell or network entity 105.

In some examples, the repeater may have limited digital processing on data and synchronization signal blocks (SSBs), which may be based on relaying with a low latency. However, the repeater device may need to know a beam direction for data and control signaling in order to relay uplink and downlink signaling. For uplink signaling, the repeater may determine the direction to the network entity 105 based on a many-to-one scenario. For example, the repeater device may relay an uplink shared channel signal from a UE 115 to the network entity 105 based on an energy detector to sense a direction of the network entity 105. For downlink signaling, the network entity 105 may assist the repeater device to determine the correct beam direction.

The wireless communications system 100, and wireless communications systems described herein, may support techniques for a physical header or preamble which correlates downlink shared channel signaling and a beam direction for a repeater device to relay the downlink shared channel signaling to an intended receiver. For example, the wireless communications system 100 may support a preamble which correlates downlink shared channel signaling to beam direction, such that the repeater device may direct or steer each downlink shared channel transmission to a best spatial beam direction.

Additionally, as carrier frequencies increase, such as from sub-6 Gigahertz bands to millimeter wave and further to sub-Terahertz systems, line of sight conditions may become more apparent, as diffraction effects may become less pronounced. Beams may also be tighter or narrower as frequencies increase to overcome free space loss. Penetration losses, such as in an outdoor-to-indoor scenario, may become more significant, resulting in lower coverage for some systems supporting very high frequencies. To improve coverage, systems may support repeater devices. However, to support highly directional beamed signaling, the repeater device may similarly be able to form tight beams toward receiving UEs 115. Wireless communications systems described herein, including the wireless communications system 100, may include repeater devices capable of acting upon beam management controls from the network entity 105. For example, the wireless communications system 100 may support dynamic beam management control of repeater beams by a serving network entity 105.

Figure 2:
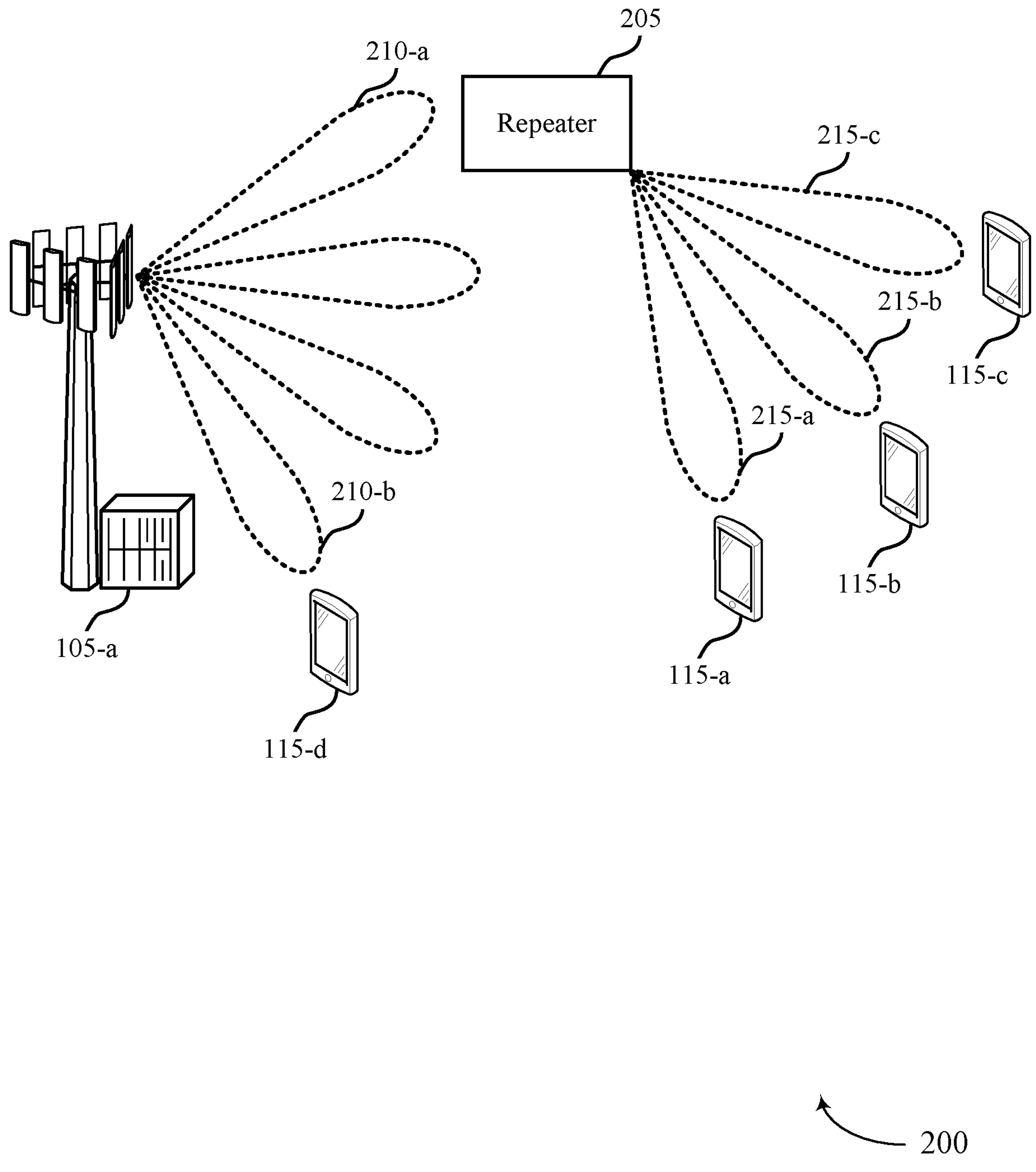
FIG. 2 illustrates an example of a wireless communications system that supports beam control techniques for a transparent repeater in accordance with one or more aspects of the present disclosure.

FIG. 2 illustrates an example of a wireless communications system 200 that supports beam control techniques for a transparent repeater in accordance with one or more aspects of the present disclosure. The wireless communications system 200 may include a network entity 105-*a* and one or more UEs 115, such as a UE 115-*a*, a UE 115-*b*, a UE 115-*c*, and a UE 115-*d*. The network entity 105-*a* may be an example of a network entity 105 as described with reference to FIG. 1, and the UEs 115 may be examples of UEs 115 as described with reference to FIG. 1.

The wireless communications system 200 may include a repeater device 205. The repeater device 205 may be an example of a smart repeater, a relay, a femto-cell, a reconfigurable intelligent surface, or another device configured to relay signaling between two devices (e.g., a UE 115 and a network entity 105).

The wireless communications system may support beamformed signaling. For example, the network entity 105-*a* may transmit using a beam 210-*a* to the repeater device 205. The repeater device 205 also may support beamformed signaling, relaying signaling from the network entity 105-*a* to UEs 115 with the beams 215. For example, the repeater device 205 may relay the signaling to the UE 115-*a* using a beam 215-*a*, to the UE 115-*b* using a beam 215-*b*, and to the UE 115-*c* using a beam 215-*c*. In some examples, the network entity 105-*a* may serve other UEs 115, such as by transmitting to the UE 115-*d* using a beam 210-*b*.

In some examples, the network entity 105-*a* may be aware that the UEs 115 are served by a transparent repeater, such as the repeater device 205. In some cases, the network entity 105-*a* may know which repeater beam is associated with which UE 115.

For example, the network entity 105-*a* may be aware that the UE 115-*a* is associated with the beam 215-*a*.

In some examples, the wireless communications system 200 may support low latency communications. For example, a downlink control channel message may schedule a downlink shared channel message in a same slot (e.g., k0 is 0). Downlink control channel reception may have a wide signal-to-noise ratio (SNR) margin compared to downlink shared channel reception. The wireless communications system 200 may support techniques which enable the repeater device 205 to align a beam 215 toward a UE 115 within the same slot, supporting the low latency signaling. Additionally, each UE 115 may be able to decode downlink control channel signaling, even before beam realignment.

The wireless communications system 200 may support signaling for repeater beam management. For example, the network entity 105-*a* may transmit a signal to the repeater device which corresponds to a beam of the repeater device 205. These techniques may enable fast beam switching of a repeater beam during a slot. In some examples, the network entity 105-*a* may transmit a signal during, or with, a downlink control channel which indicates a beam switch for the repeater device 205. In some examples, the network entity 105-*a* may attach a preamble to a downlink shared channel symbol, where the preamble indicates the beam switch for the repeater device 205. The repeater device 205 may have transparent beam management (e.g., transparent to UEs 115) instead of directing a wide beam with lower directivity gain and spatial separation. These techniques may improve repeater beam management to provide increased throughput, an increase quantity of UEs served by the repeater device 205, and enhanced cell coverage.

In some examples, the signal may be an example of a physical signal. For example, the physical signal may be transmitted with, or during, downlink control channel signaling. In some cases, the signal may be an example of downlink control information with a format related to repeater beam management. For example, the signal may have a format referred to as DCI-R, a repeater downlink control information, a repeater beam control signal, a repeater beam switch signal, or any combination thereof. The signal may have multiple variations or sequences, where each beam 215 of the repeater device 205 corresponds to a different variation or sequence. The repeater device 205 may detect which of the distinct signals are transmitted by the network entity 105 within a single symbol and change beams, or begin changing beams, immediately following detection of the signal.

In some examples, the signal may be transmitted during a same symbol as downlink control information. For example, the signal may be frequency division multiplexed with downlink control information scheduling data transmissions to the UEs 115. An example of a slot format including the signal is described in more detail with reference to FIG. 3. In some examples, the repeater device 205 may relay the downlink control information using a wide beam, which may enable a target UE 115 to receive the downlink control information even when the beam is not aligned toward the target UE 115. An example of using a wide beam to relay the downlink control information is described in more detail with reference to FIG. 4.

In some examples, the wireless communications system 200 may support a preamble to correlate a physical downlink shared channel (PDSCH) to a beam direction. For example, the preamble may correlate PDSCH to beam direction such that the repeater device 205 may direct or steer each PDSCH transmission to a best spatial beam direction. In some examples, the network entity 105-*a* and the repeater device 205 may have shared look up tables between preamble sequences and beam directions or served UEs 115. The network entity 105-*a* may select a preamble sequence according to a beam direction for a UE 115.

When the repeater device 205 establishes a connection with the network entity 105-*a*, the repeater device 205 may report a capability to relay a signal with low latency. For example, the repeater device 205 may report a capability to relay the signal with low latency compared to a cyclic prefix length of the signal. The repeater device 205 may include a quantity of beams that the repeater device 205 supports for transmission and reception. In some cases, the quantity of beams may be based on a capability of the repeater device 205 or coverage limitations (e.g., if the repeater device 205 is serving a small area). In some examples, the repeater device may indicate a capability to transmit multiple beams simultaneously and a quantity of beams (e.g., for simultaneous transmission or for frequency grouping).

In some examples, the repeater device 205 may indicate whether the repeater device 205 supports PDSCH or physical uplink shared channel (PUSCH) preamble relaying. In some cases, the repeater device 205 may indicate a gap (e.g., a required gap based on repeater capability) between the preamble and the PDSCH. In some cases, the gap may be based on a class of the repeater device 205. Additionally, or alternatively, the repeater device 205 may indicate whether the repeater device 205 supports UE-based preamble relaying or beam-based preamble relaying. For example, the repeater device 205 may support UE-based preamble relaying if the repeater device 205 can distinguish and beamform between UEs 115 on a same served beam. Example configurations for the preamble are described in more detail with reference to FIG. 5.

When the repeater device 205 is operating in a relay mode, the network entity 105-*a* may transmit control signaling to configure the repeater device 205 to a quantity of beams to serve the UEs 115. In some cases, the configuration or the quantity of beams may be based on the reported repeater capability or an indicated quantity of beams supported by the repeater device 205. The control signaling, or the configuration, may include a map between preamble sequences and beam indexes. In some examples, the mapping between the preamble sequences and the beam indexes may be based on a lookup table stored at the repeater device 205 or the network entity 105-*a*, or both, or based on a lookup table configured via RRC signaling. Some examples of preamble sequences may include Zadoff-Chu sequences, Gold sequences, and Walsh codes, among others. Each preamble sequence may be used to generate a specific waveform, or a physical signal having certain properties, that differs from waveforms or physical signal generated using a different preamble sequence, permitting the repeater device 205 to differentiate between which beam of a quantity of beams to use.

The network entity 105-*a* may transmit one or more SSBs in a direction of the repeater device 205. The repeater device 205 may relay each SSB to a different spatial direction to cover an area served by the repeater device 205. In some examples, the SSBs may be transmitted using the beams 215 of the repeater device 205 or the beams indicated by the repeater device 205. In some examples, if the repeater device 205 is only serving one UE per beam index (e.g., there is only one connected UE 115 on each beam index), a default preamble configuration may be used for a mapping between preambles and beam indexes.

In some examples, the repeater device 205 may transmit control signaling indicating that a beamforming capability of the repeater device 205 or a quantity of supported beams at the repeater device 205 exceeds a quantity of configured beams. In some examples, the repeater device 205 may request for a preamble mapping between PDSCH and connected UEs 115 (e.g., instead of beams). In some cases, mapping preamble sequences to UEs 115 may use a larger payload or a greater quantity of preamble sequences but may improve relay beamforming gains. In some cases, in response, the network entity 105-*a* may map radio network temporary identifier (RNTI) bits for each UE 115, or at least parts of RNTI bits, to a specific preamble sequences. For example, a first RNTI for the UE 115-*a* may be mapped to a first preamble sequence, and a second RNTI for the UE 115-*b* may be mapped to a second preamble sequence. For example, there may be a set of preamble sequences, and each UE may be mapped to a sequence based on an order of time of connection or an order of RNTI bits. In some cases, the network entity 105-*a* may transmit signaling indicating the RNTIs of the connected UEs 115 to the repeater device 205 periodically or aperiodically (e.g. via a MAC control element or other signaling).

A UE 115 may connect to a beam of the repeater device 205 based on the transmitted SSBs. In some examples, there may only be one connected UE 115 to the repeater device 205. In this example, the repeater device 205 may direct PDSCH and PDCCH to the connected UE direction without any preamble. For example, the network entity 105-*a* may not include a preamble sequence in a physical header to the repeater device 205 if the repeater device serves a single UE 115.

In some examples, multiple UEs 115 may connect to the repeater device 205. If there are multiple UEs 115 connected to the repeater device 205, the network entity 105-*a* may transmit control signaling indicating the preamble sequences and mapping to the repeater device 205. For example, the network entity 105-*a* may configure the repeater device 205 with the preamble information. The network entity 105-*a* may indicate if the preamble sequences correlate between PDSCHs, beams, or RNTIs, or any combination thereof. In some examples, the network entity 105-*a* may update the mapping configuration, such as changing the mapping from being between sequences and beams to being between sequences and UEs 115 (e.g., UE RNTIs). The network entity 105-*a* may periodically or aperiodically indicate the mapping configuration, or what the mapping is between, such as via a MAC control element or RRC signaling.

In some examples, the network entity 105-*a* may have new data to transmit to a UE 115. The network entity 105-*a* may transmit PDSCH to the repeater device 205 (e.g., in a direction of the repeater device 205) with an added preamble at the begging of the slot. The repeater may estimate a probability of the received preamble sequence corresponding to each of the different preamble sequences, such as by using a time domain correlator with low latency. Based on a value, likelihood, or satisfying a threshold that the received preamble sequence corresponds to one of the preamble sequences, the repeater device 205 may relay the upcoming signal in a beam direction which corresponds to the determined preamble sequence.

For example, the network entity 105-*a* may have a PDSCH message for the UE 115-*a*, and the network entity 105-*a* may transmit a signal to the repeater device with a preamble sequence in the beginning of the slot with the PDSCH message. The repeater device 205 may determine that the received preamble sequence corresponds to the beam 215-*a* based on a lookup table mapping different preamble sequences to different beam directions. The network entity 105-*a* may transmit the PDSCH message to the repeater device 205, and the repeater device 205 may relay the PDSCH message using the beam 215-*a* based on the mapping. In some cases, the network entity 105-*a* may indicate a time to relay the signal to the repeater device 205, which may provide time for the repeater device 205 to perform beam management. In some examples, the repeater device 205 may follow the configuration from the network entity 105-*a* and relay signaling from the beams 210 via the beams 215 (e.g., the configured beams).

In some cases, the UE 115-*a* may be aware that the PDSCH message is being relayed by the repeater device 205. Additionally, the UE 115-*a* may be aware that a preamble sequence is added to the first or last OFDM symbol. The UE 115-*a* may reduce power consumption by correlating on the preamble and determining whether the UE 115-*a* is the intended recipient of the PDSCH message. For example, if a UE 115 determines that a PDSCH message is intended for a different UE 115 based on a detected preamble sequence, the UE 115 may disable power to radio frequency components to reduce power consumption. In some examples, the network entity 105-*a* may indicate to the UEs 115 whether preamble sequences are mapped to beams (e.g., beam indexes) or UE RNTIs.

In some cases, the network entity 105-*a* may configure the repeater device 205 in advance with an allocation of resources, such as one or two resource blocks. In this example, the network entity 105-*a* may transmit an indication of the beam index, UE RNTI, or beam direction to the repeater device 205 via the allocation ahead of a PDSCH. In this example, the network entity 105-*a* may not transmit the preamble sequence and instead transmit during the allocation to prepare the repeater device 205 for the PDSCH in a next slot or symbol.

In some examples, the network entity 105-*a* may update the mapping. For example, a UE 115 may move in the wireless communications system 200, and the network entity 105-*a* may transmit an updated mapping to the repeater device based on the mobility. For example, preamble sequences may correspond to UE RNTIs, and the network entity 105-*a* may update the mapping for a UE 115 that has moved to correspond to a new beam for the UE 115. In some cases, the network entity 105-*a* may update the mapping based on a change in quantity of UEs 115 served by the repeater device 205 or a change in one or more UE locations.

In some cases, a quantity of SSBs may be the same as a quantity of served beams from the repeater device 205 to UEs 115. In this case, a mapping between preamble sequences and beams 215 may be based on each beam 215 holding a same SSB index with a constant differentiation. For example, there may be four SSBs directed toward the repeater device 205, and the repeater device 205 may have four beams serving UEs 115. The beam mapping may, for example, be that a first beam from the network entity 105-*a* corresponds to a first beam from the repeater device 205. For example, if SSBs 2 through 4 point toward the repeater device 205 from the network entity 105-*a*, and the repeater device 205 serves UEs 115 using three beams, SSB2 may correspond to beam 0, SSB3 may correspond to beam 1, and SSB4 may correspond to beam 2.

In this example, the network entity 105-*a* may be aware of how each beam 210 corresponds to each beam 215, and how each UE 115 is associated with each beam 210 based on a mapping to a specific repeater beam. When PDSCH is allocated, a physical header may indicate to the repeater device 205 to relay the PDSCH to the intended receiver (e.g., UE 115). For example, if the UE 115 is on beam 1 of the repeater device 205, the physical header may notify the repeater device 205 to relay the PDSCH via beam 1.

In another example, a quantity of SSBs directed to the repeater device 205 may be fewer than a quantity of beams served by the repeater device 205. In this example, the mapping may be configured with assistance from the repeater device 205, as the network entity 105-*a* may not be aware of each UE serving beam. For example, only SSB2 may point toward the repeater device 205, but the repeater device 205 may have four beams 215 serving UEs 115. Therefore, each UE 115 is connected via SSB2 from the network entity 105, but these UEs 115 connected using different beams 215 of the repeater device 205. The repeater device 205 may indicate a beam management procedure of the repeater device to the network entity 105-*a*. For example, the repeater device 205 may notify the network entity 105-*a* of the quantity of beams 215 relayed to UEs 115 and the periodicities of the beams. The network entity 105-*a* may transmit an indication a mapping between each beam and the corresponding preamble sequence. For example, a first occasion of SSB2 may correspond to beam 0 of the repeater device 205, a second occasion of SSB2 may correspond to beam 1, a third occasion to beam 2, and a fourth occasion to beam 3. The network entity 105-*a* may be aware of the time of each random access occasion and on which repeater beam the UEs 115 are on. When PDSCH is allocated, a physical header may indicate for the repeater device 205 to relay the PDSCH to the intended receiver.

In some other examples, the repeater device 205 may indicate a mapping between beams 215 and UEs 115. For example, the repeater device 205 may indicate a used beam for each served UE 115. If a UE 115 changes beams, the repeater device 205 may indicate the change to the network entity 105-*a*.

Figure 3:
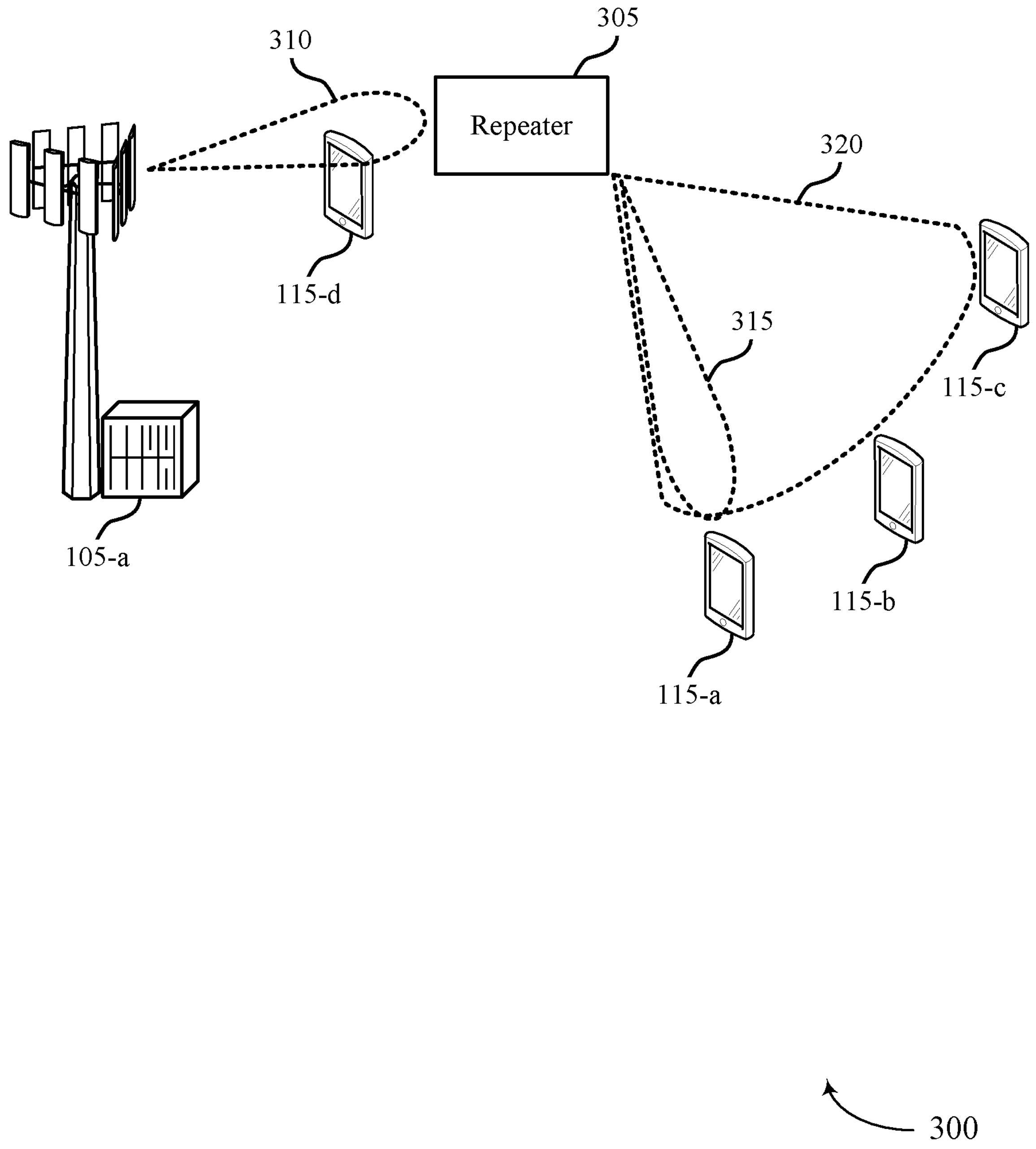
FIG. 3 illustrates an example of a wireless communications system that supports beam control techniques for a transparent repeater in accordance with one or more aspects of the present disclosure.

FIG. 3 illustrates an example of a wireless communications system 300 that supports beam control techniques for a transparent repeater in accordance with one or more aspects of the present disclosure. The wireless communications system 300 may include a network entity 105-*a*, a repeater device 305, and one or more UEs 115, such as a UE 115-*a*, a UE 115-*b*, and a UE 115-*c*. The network entity 105 and the UEs 115 may be examples of corresponding devices as described with reference to FIG. 1. The repeater device 305 may be an example of a repeater device described herein, such as a repeater device 205 described with reference to FIG. 2.

The wireless communications system 300 may support techniques for a beam switch signal. For example, the network entity 105-*a* may communicate with the UEs 115 via the repeater device 305. The network entity 105-*a* may transmit downlink control information to schedule PDSCH for a UE 115 within a same slot. Therefore, the techniques described herein may enable the repeater device 305 to align a beam toward the UE 115 within the same slot.

For example, the network entity 105-*a* may transmit a signal using beam 310 to the repeater device 305. The signal may be a physical signal including a sequence that corresponds to one of the beams of the repeater device 305. For example, the signal may include a sequence that corresponds to a beam 315, used to relay signaling for the UE 115-*a*. Based on the signal being a physical signal, the repeater device 305 may immediately determine that a sequence associated with the signal corresponds to the beam 315, and the repeater device 305 may begin switching beams to the beam 315.

In some examples, the signal may be an example of downlink control information. For example, the signal may be downlink control information with a format specific to repeater beam changes. For example, a downlink control information transmission with this format may command the repeater device 305 to change to a beam corresponding to a sequence of the downlink control information.

The network entity 105-*a* may also transmit downlink control information to the repeater device 305 to schedule PDSCH for the UE 115-*a*. In some examples, PDSCH for UEs 115 served by the repeater device 305 may be scheduled with an offset from downlink control information scheduling the PDSCH. For example, there may be a time domain gap between the downlink control information and the PDSCH to enable the repeater device 305 to switch beams. In some examples, the gap may be a quantity of symbol periods (e.g., one or two symbol periods). In some examples, the repeater device 305 may transmit signaling to the network entity 105-*a* indicating a repeater beam change capability. For example, the repeater beam change capability may indicate a time for the repeater device 305 to switch between beams. PDSCH for a UE 115 served by the repeater device 305 may be scheduled based on the repeater change capability of the repeater device. In some examples, the repeater device 305 may have beam information for the wide beam 320 in a codebook at the repeater device 305. In some cases, the network entity 105-*a* may configure the repeater device 305 to relay PDCCH using the wide beam 320.

In some examples, the repeater device 305 may relay the downlink control information to the UEs 115. For example, the repeater device 305 may transmit PDCCH, such as the downlink control information scheduling the PDSCH, using a wide beam 320. Using a wide beam to relay PDCCH may enable a UE 115 served by the repeater device 305 to receive the PDCCH even when a narrow beam of the repeater device 305 is not aligned toward the UE 115. By relaying the PDCCH using a wide beam, the UEs 115 may receive the downlink control information scheduling the PDSCH and, if the PDSCH is scheduled for a UE 115, that UE 115 may prepare to receive the PDSCH.

In some examples, the PDSCH for the UE 115-*a* may be multiplexed with other PDSCHs for other UEs 115. For example, the PDSCH may be frequency division multiplexed with the other PDSCHs for other UEs 115, such as a UE 115-*d*, which may be directly served by the network entity 105-*a*.

Figure 4:
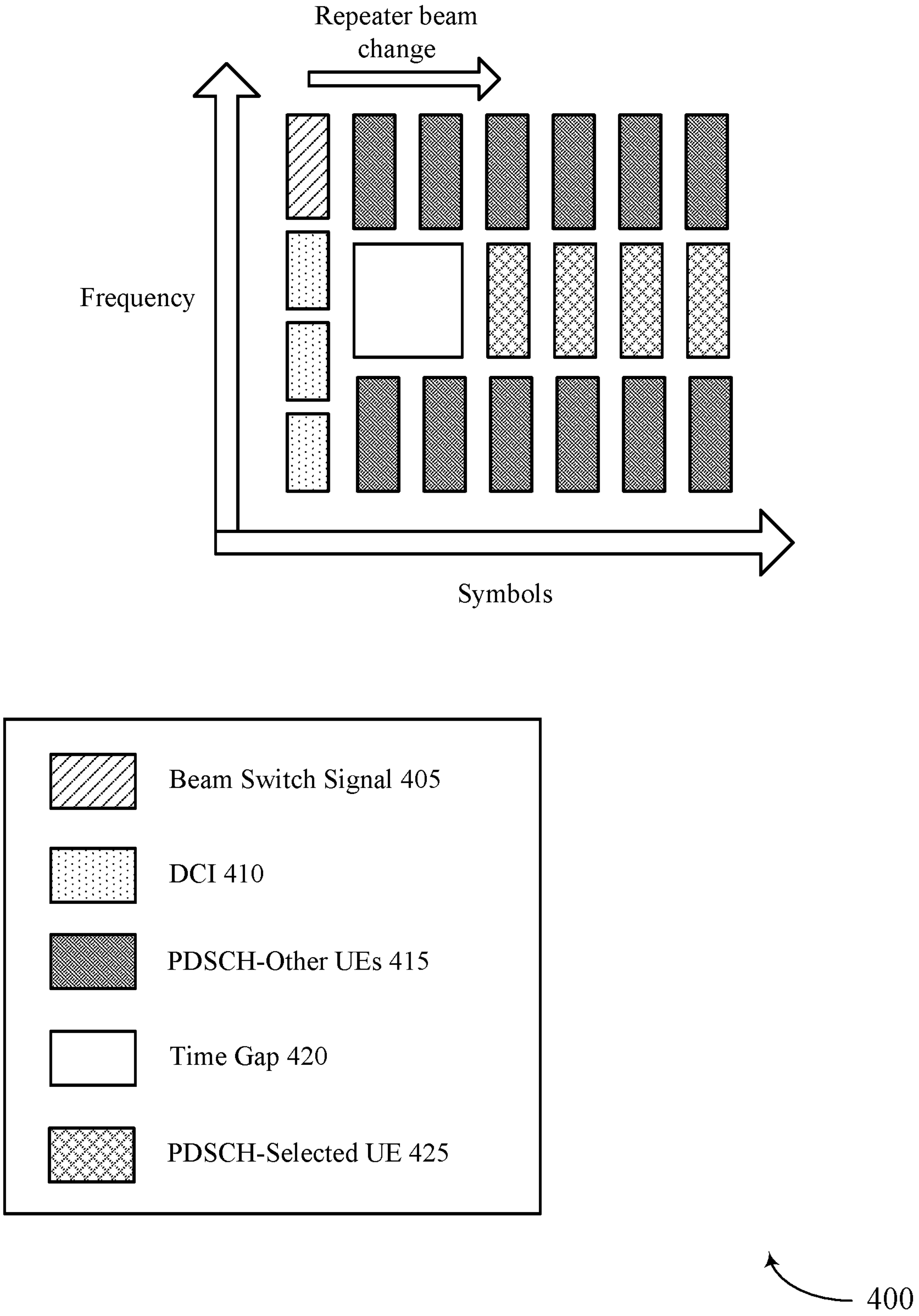
FIG. 4 illustrates an example of a beam switch signal slot that supports beam control techniques for a transparent repeater in accordance with one or more aspects of the present disclosure.

FIG. 4 illustrates an example of a beam switch signal slot 400 that supports beam control techniques for a transparent repeater in accordance with one or more aspects of the present disclosure.

A network entity 105 and a UE 115 may communicate via a relay or a repeater device. The repeater device may use beamformed signaling to relay PDSCH from the network entity 105 to the UE 115. The repeater device may use multiple narrow beams to serve UEs 115. Therefore, the repeater device may need sufficient time to switch beams between receiving downlink control information scheduling a PDSCH and transmission of the PDSCH.

The beam switch signal slot 400 illustrates an example of a slot (e.g., a time slot) with a beam switch signal 405. The network entity 105 may transmit a beam switch signal 405 to the repeater device which includes, or corresponds to, a sequence associated with one of the beams of the repeater device. A Zadoff-Chu sequence, a Walsh code, or a gold sequence may be examples of the sequence. The sequence may be a known sequence that may be used to generate a waveform (e.g., known by the UE 115, the repeater device, or the network entity 105, or any combination thereof) which may be detected using a matched filter or correlator. For example, different sequences for the signal may be mapped to different beams of the repeater device. The network entity 105 may transmit the signal including a sequence corresponding to a beam used for a UE 115 that is scheduled for PDSCH. The repeater device may receive the signal and use a matched filter or correlator to determine which of the different, configured sequences correspond to a sequence of the received signal. The repeater device may determine that the sequence of the received signal correlates to a sequence associated with a first beam, and the repeater device may switch to the first beam based on the correlation.

In some examples, the network entity 105 may transmit control signaling to the repeater device indicating the mapping between sequences and beams of the repeater device. The beam switch signal 405 may be a physical signal. In some examples, the repeater device may immediately identify a beam corresponding to the sequence of the beam switch signal 405 upon receipt of the beam switch signal 405, and the repeater device may begin switching to the identified beam.

The beam switch signal 405 may be frequency division multiplexed with downlink control information 410. For example, the network entity 105 may transmit the beam switch signal 405 and the downlink control information 410 in a same symbol. The downlink control information may schedule a UE 115 to receive a PDSCH 425. In some examples, the repeater device may relay the downlink control information 410 using a wide beam.

In some examples, the downlink control information 410 to schedule the PDSCH 425 for the UE 115 may be multiplexed with other downlink control information for other UEs 115. For example, the downlink control information 410 may be multiplexed (e.g., frequency division multiplexed) with downlink control information scheduling other UEs 115 for other PDSCH 415. In some examples, the network entity 105 may transmit downlink control information to schedule UEs 115 which are served by the repeater device and UEs 115 which are served directly by the network entity 105.

In some cases, the downlink control information 410 may schedule the PDSCH 425 for the UE 115 in accordance with a repeater beam change capability of the repeater device. For example, the PDSCH 425 may be scheduled for the UE 115 with a time gap 420 (e.g., one, two, or more symbol periods) between the downlink control information 410 and the PDSCH 425. In some examples, the repeater device may transmit signaling indicating the repeater beam change capability of the repeater device to the network entity 105 (e.g., indicating a defined or minimum duration in time of the time gap 420). In some examples, the network entity 105 may use resources during the time gap 420 to communicate with other devices, such as other UEs 115.

After the time gap and based on the repeater beam change capability, the network entity 105 may transmit the PDSCH 425 to the repeater device, and the repeater device may relay the PDSCH to the UE 115 using the beam corresponding to a sequence corresponding to the beam switch signal 405. For example, the repeater device may transmit the PDSCH to the UE 115 using a narrow beam directed toward the UE 115.

In some examples, the PDSCH 425 for the UE 115 may be multiplexed with other PDSCHs 415 for other UEs 115. For example, the PDSCH 425 may be frequency division multiplexed with the other PDSCHs 415 for other UEs 115, which may be directly served by the network entity 105.

Figure 5:
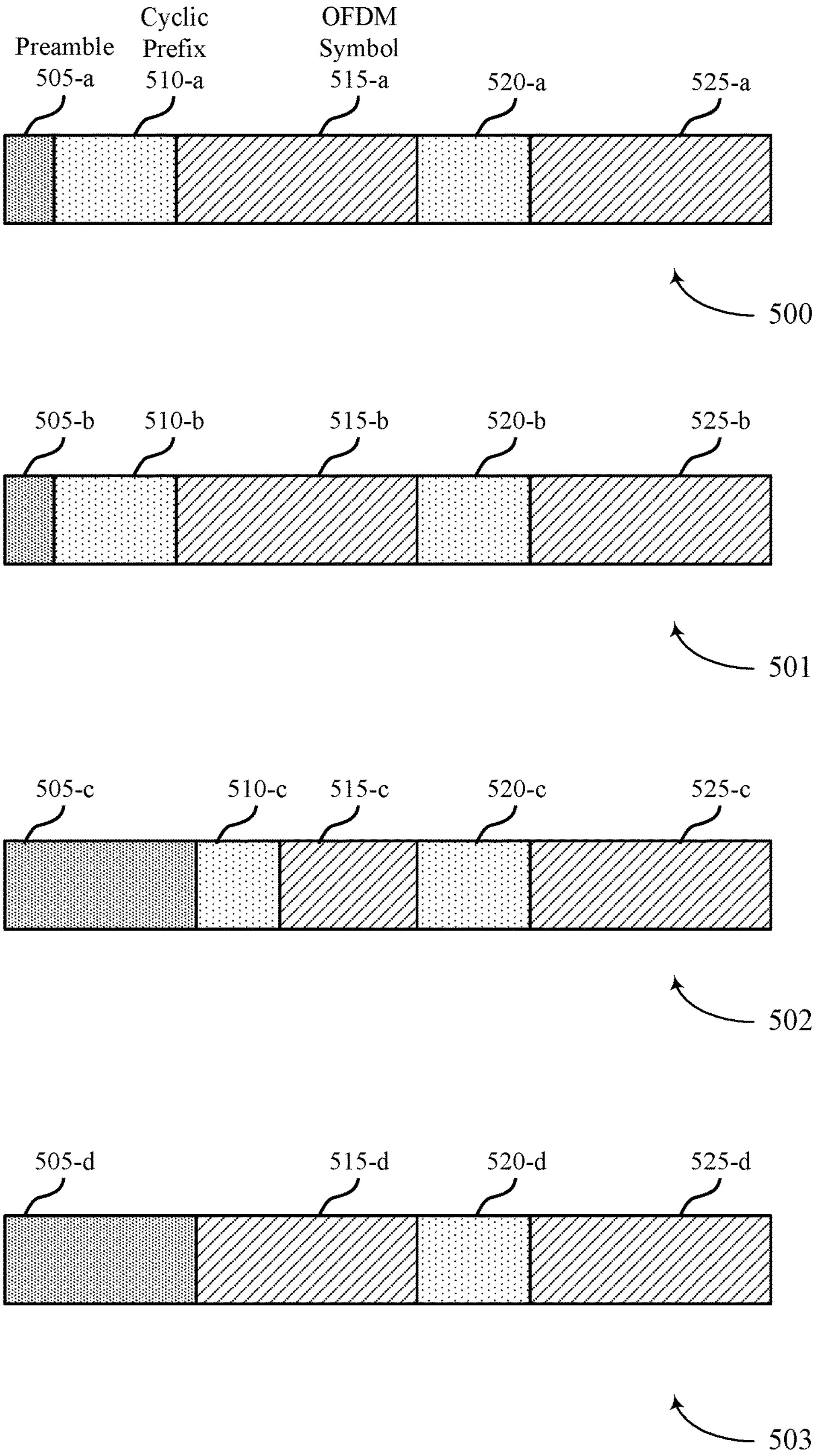
FIG. 5 illustrates examples of preamble configurations that support beam control techniques for a transparent repeater in accordance with one or more aspects of the present disclosure.

FIG. 5 illustrates examples of preamble configurations 500 that support beam control techniques for a transparent repeater in accordance with one or more aspects of the present disclosure. The preamble configurations may correspond to different example configurations for a preamble sequence in a physical header of a slot used to indicate a beam of a repeater device.

In some systems, there may be an additional time period in a cyclic prefix of each slot. In some cases, such as for 30 kHz subcarrier spacing, there may be an additional 0.5 pts in the first symbol cyclic prefix of each slot. These additional samples may be used for a data preamble. A quantity of samples in this time period may be based on a bandwidth of a channel including the slot. For higher subcarrier spacing, the time period may be smaller, but with an increased bandwidth, the quantity of samples may be similar. In some examples, the slot may include guard intervals (e.g., between a preamble 505 and a first cyclic prefix 510 or between the preamble 505 and a first OFDM symbol 515) to reduce inter-symbol interference on the preamble 505.

The preamble configuration 500 shows a first example of a configuration for a preamble 505 to indicate a beam of a repeater device. For example, a slot may include a preamble 505-*a*, a first cyclic prefix 510-*a* for a first OFDM symbol 515-*a*, and a second cyclic prefix 520-*a* for a second OFDM symbol 525-*a*. In this example, the preamble 505-*a* may be transmitted using the additional samples in the first cyclic prefix 510-*a*.

The preamble configuration 501 shows a second example of a configuration for a preamble 505 to indicate a beam of a repeater device. For example, a slot may include a preamble 505-*b*, a first cyclic prefix 510-*b* for a first OFDM symbol 515-*b*, and a second cyclic prefix 520-*b* for a second OFDM symbol 525-*b*. The preamble 505-*b* may be an example of an out-of-band preamble, using a higher bandwidth than the data (e.g., the first OFDM symbol 515-*b* and the second OFDM symbol 525-*b*) to increase processing gain and a quantity of samples to the symbol. For example, the preamble 505-*b* may have twice as many samples as the preamble 505-*a* based on using a higher bandwidth for the OFDM symbols.

The preamble configuration 502 shows a third example of a configuration for a preamble 505 to indicate a beam of a repeater device. For example, a slot may include a preamble 505-*c*, a first cyclic prefix 510-*c* for a first OFDM symbol 515-*c*, and a second cyclic prefix 520-*c* for a second OFDM symbol 525-*b*. In this example, a first symbol in the slot may be split into two symbols with double the subcarrier spacing. A first symbol with double the subcarrier spacing may be used for the preamble 505-*c*, while the second symbol with double the subcarrier spacing (e.g., the first OFDM symbol 515-*c*) is half the duration of the second symbol 525-*c* based on the increased subcarrier spacing. In some examples, some PDCCH bits may be included in the preamble 505-*c* to increase PDCCH information for the slot.

The preamble configuration 503 shows a fourth example of a configuration for a preamble 505 to indicate a beam of a repeater device. For example, a slot may include a preamble 505-*d*, a first OFDM symbol 515-*d*, and a second cyclic prefix 520-*d* for a second OFDM symbol 525-*d*. This example may use a single carrier waveform for the first OFDM symbol 515-*d*. Initial date of the first OFDM symbol 515-*d* may include the preamble 505-*d*. The first OFDM symbol 515-*d* may include control and data information.

Figure 6:
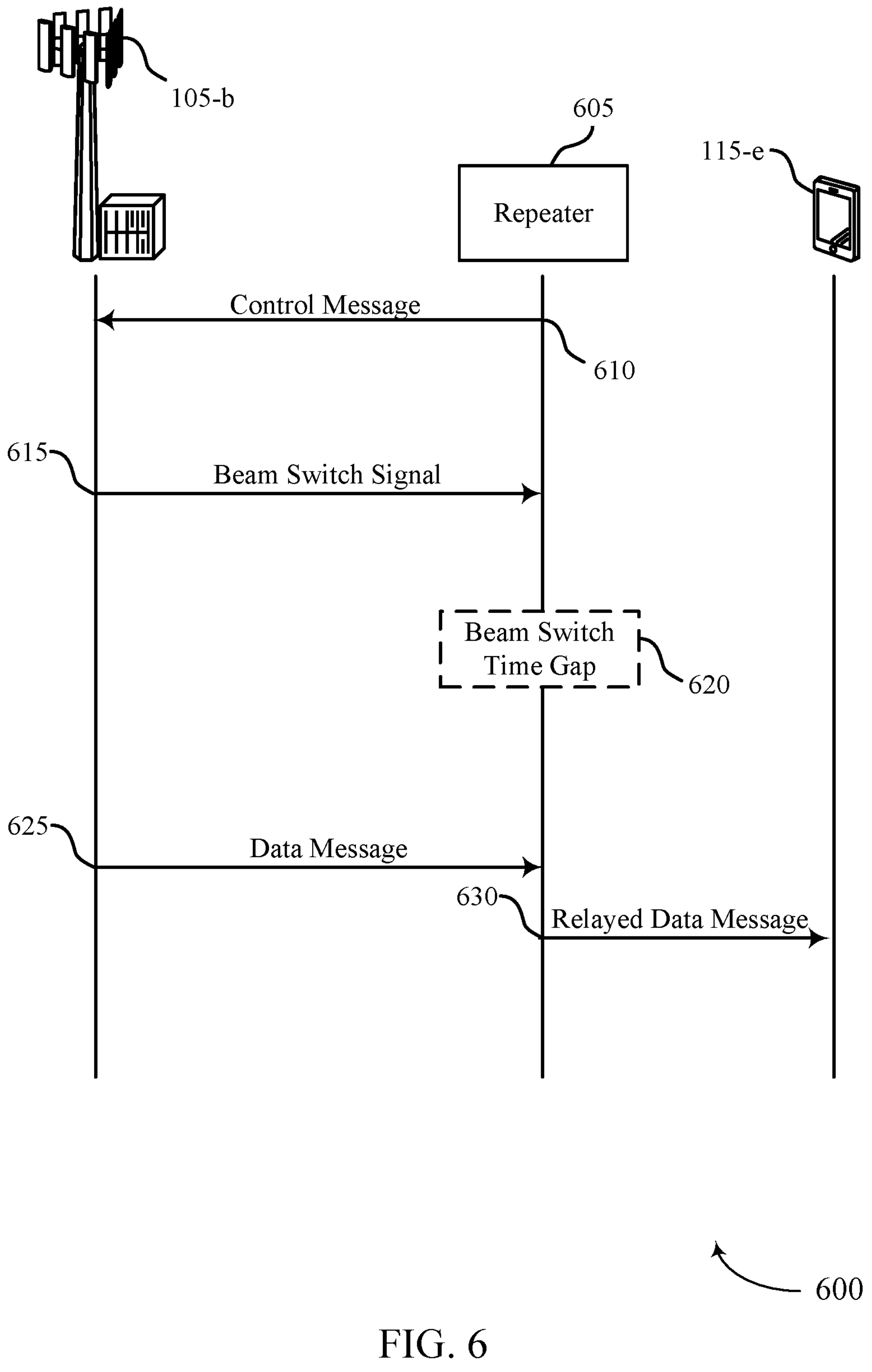
FIG. 6 illustrates an example of a process flow that supports beam control techniques for a transparent repeater in accordance with one or more aspects of the present disclosure.

FIG. 6 illustrates an example of a process flow 600 that supports beam control techniques for a transparent repeater in accordance with one or more aspects of the present disclosure. The process flow 600 may be implemented by a network entity 105-*b*, a repeater device 605, and a UE 115-*e*, which may each be respective examples of a network entity 105, a repeater device, and a UE 115 as described with reference to FIGS. 1 through 5.

At 610, the repeater device 605 may transmit, to the network entity 105-*b*, a control message indicating a set of beams of the repeater device 605. For example, the repeater device 605 may transmit the control message indicating a mapping between a set of UEs 115 (e.g., including the UE 115-*e*) and the set of beams.

In some examples, the repeater device 605 may transmit, and network entity 105-*b* may receive, a capability report indicating a beam switch capability of the repeater device 605. In some examples, the capability report may indicate a capability of the repeater device 605 to relay signaling with low latency. In some examples, the capability report may include a quantity of beams supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof. In some examples, the time gap between the preamble and the transmission of the data message may correspond to a beam switch time gap 620. In some examples, the time gap indicated by the capability report may correspond to a minimum amount of time for the repeater device 605 to switch beams.

In some examples, in response to the control message, the network entity 105-*b* may transmit, and the repeater device 605 may receive, control signaling indicating a mapping between sequences and beams of the repeater device. For example, the repeater device 605 may receive a control message indicating a set of sequences, where each sequence of the set of sequences corresponds to a different beam of the set of beams of the repeater device 605.

At 615, the network entity 105-*b* may transmit, and the repeater device 605 may receive, a beam switch signal, indicating for the repeater device 605 to switch to a beam corresponding to the beam switch signal. For example, the repeater device 605 may receive, from the network entity 105-*b*, a signal within a time slot indicating a first beam of the set of beams. In some examples, the signal may be a physical signal, where a sequence used to generate the physical signal corresponds to a beam of the repeater device. For example, the physical signal may have a known waveform, with a duration extending multiple samples or spanning multiple subcarriers. The repeater device may receive the physical signal, process the physical signal (e.g., a waveform or sequence of the physical signal) using a matched filter or correlator, and determine that the waveform or the sequence of the physical signal corresponds to a waveform or sequence associated with the beam. Additionally, or alternatively, the signal may be a preamble or a physical header, and a sequence of the preamble or the physical header may correspond to the beam of the repeater device.

In some examples, the network entity 105-*b* may transmit downlink control information to the UE 115-*e* via the repeater device 605. For example, the repeater device 605 may relay, from the network entity 105-*b* to the UE 115-*e* via a wide beam, a downlink control information message scheduling a data message. In some examples, the downlink control information message may be frequency division multiplexed with the signal.

At 625, the network entity may transmit a data message to the repeater device 605 for the repeater device 605 to relay to the UE 115-*e*. For example, the repeater device 605 may relay, via the first beam in accordance with a beam switch time gap 620 of the repeater device, the data message from the network entity 105-*b* to the UE 115-*e* associated with the first beam within the time slot based on the signal. In some examples, network entity 105-*b* may schedule the data message for the UE 115-*e* in accordance with the beam switch gap 620. For example, the beam switch time gap 620 may occur between downlink control information scheduling the data message and transmission of the data message. During the beam switch gap 620, the network entity 105-*b* may avoid or prevent transmission of the data message. For example, the beam switch signal received at 615 may indicate a beam for the repeater device 605 to use to relay the data message. The repeater device 605 may perform a beam switch procedure to switch to the indicated beam (e.g., during the beam switch gap 620), and the repeater device 605 may relay the data message to the UE 115-*e* using the indicated beam. For example, performing the beam switch procedure may include changing a phase shifter configuration in case of a phased array, changing to a beam in accordance with a beamforming codebook, changing a transmit or receive antenna panel, switching antenna elements within a phased array on or off, or switching to another transmit or receive antenna element (e.g., if using a lensed beam steering antenna), or any combination thereof.

However, because the network entity 105-*b* does not transmit data during this time gap 620 when the repeater device 605 is performing a beam switch procedure, there will be no data missed during this time where the repeater device 605 may not be capable of relaying data due to actively switching beams. For example, at 625, the repeater device 605 may receive the data message from the network entity 105-*b*, and at 630, the repeater device 605 may transmit the data message to the UE 115-*e*.

In some examples, the data message may be scheduled in accordance with a beam switch time gap 625. For example, the repeater device 605 may switch beams over a period of time. The data message may be scheduled for the UE 115-*e* after the beam switch time gap 625 to provide sufficient time for the repeater device 605 to complete the beam switch procedure.

Figure 7:
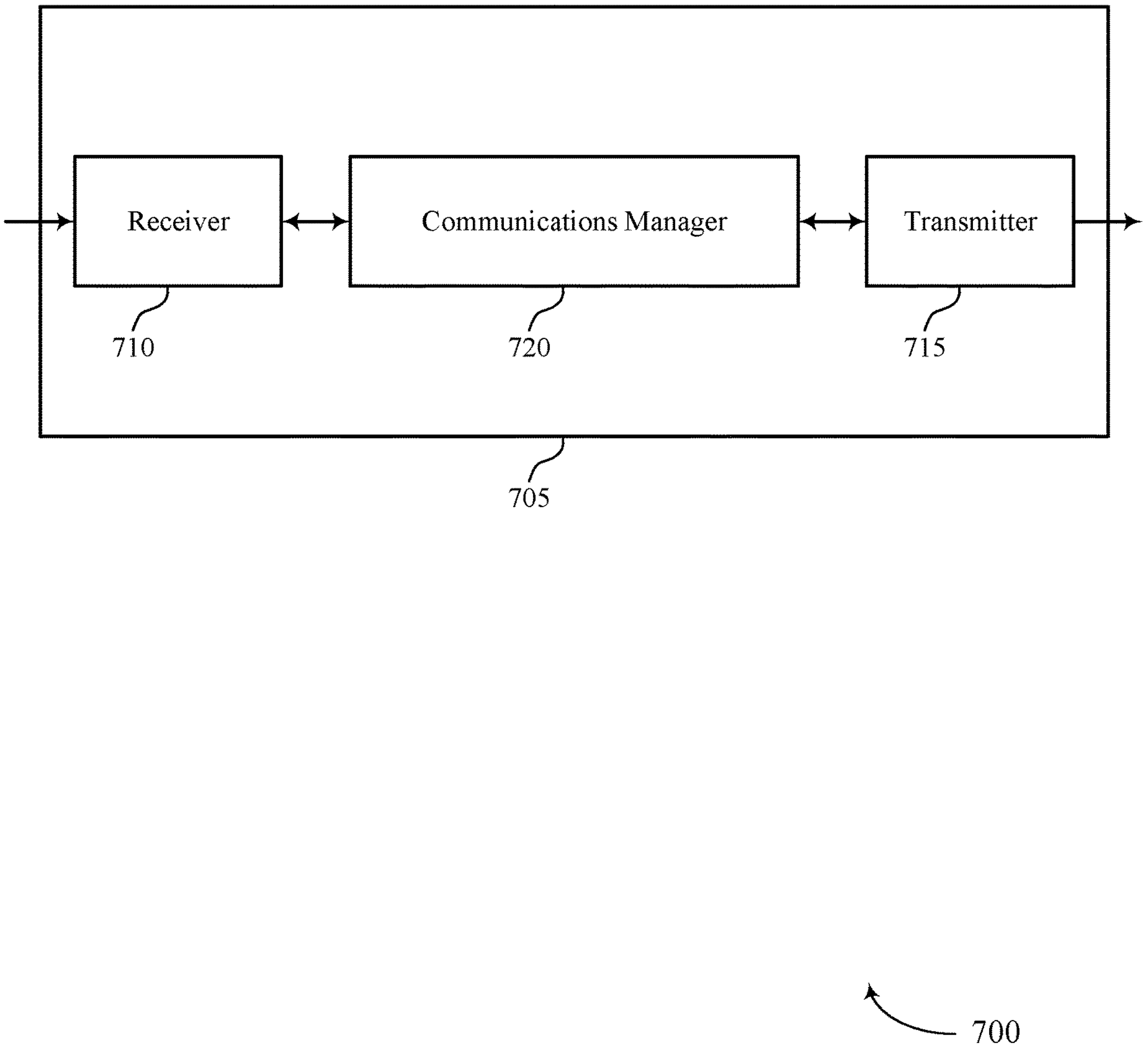
FIGS. 7 and 8 show block diagrams of devices that support beam control techniques for a transparent repeater in accordance with one or more aspects of the present disclosure.

FIG. 7 shows a block diagram 700 of a device 705 that supports beam control techniques for a transparent repeater in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam control techniques for a transparent repeater). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam control techniques for a transparent repeater). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of beam control techniques for a transparent repeater as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a repeater device in accordance with examples as disclosed herein. For example, the communications manager 720 may be configured as or otherwise support a means for transmitting, to a network entity, a control message indicating a set of multiple beams of the repeater device. The communications manager 720 may be configured as or otherwise support a means for receiving, from the network entity, a signal within a time slot indicating a first beam of the set of multiple beams. The communications manager 720 may be configured as or otherwise support a means for relaying, via the first beam, a data message from the network entity to a UE associated with the first beam within the time slot based on the signal.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources by reducing latency for systems employing repeater devices while improving beamforming gain for signaling from repeater devices.

Figure 8:
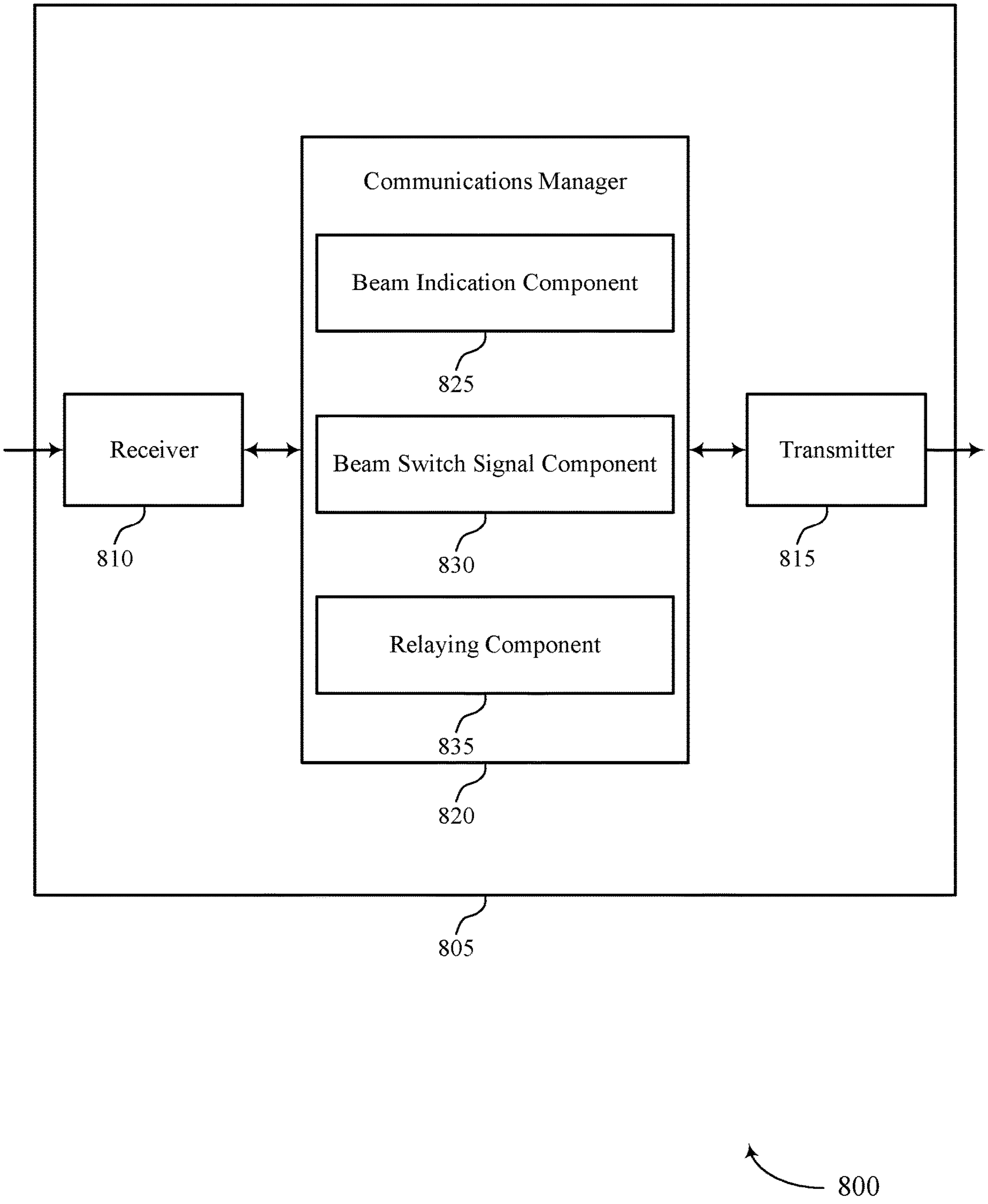

FIG. 8 shows a block diagram 800 of a device 805 that supports beam control techniques for a transparent repeater in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to beam control techniques for a transparent repeater). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam control techniques for a transparent repeater). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of beam control techniques for a transparent repeater as described herein. For example, the communications manager 820 may include a beam indication component 825, a beam switch signal component 830, a relaying component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a repeater device in accordance with examples as disclosed herein. The beam indication component 825 may be configured as or otherwise support a means for transmitting, to a network entity, a control message indicating a set of multiple beams of the repeater device. The beam switch signal component 830 may be configured as or otherwise support a means for receiving, from the network entity, a signal within a time slot indicating a first beam of the set of multiple beams. The relaying component 835 may be configured as or otherwise support a means for relaying, via the first beam, a data message from the network entity to a UE associated with the first beam within the time slot based on the signal.

Figure 9:
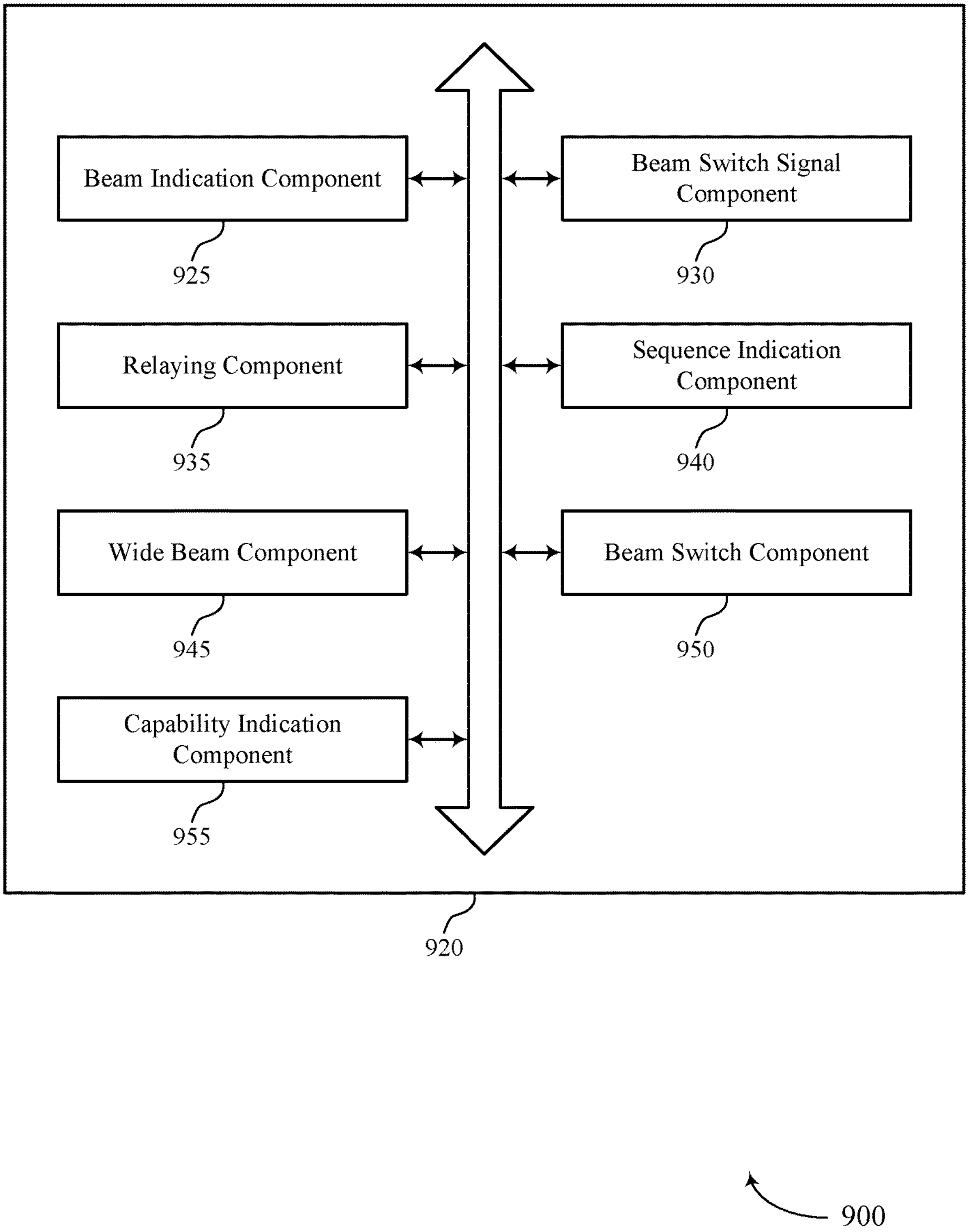
FIG. 9 shows a block diagram of a communications manager that supports beam control techniques for a transparent repeater in accordance with one or more aspects of the present disclosure.

FIG. 9 shows a block diagram 900 of a communications manager 920 that supports beam control techniques for a transparent repeater in accordance with one or more aspects of the present disclosure. The communications manager 920 may be an example of aspects of a communications manager 720, a communications manager 820, or both, as described herein. The communications manager 920, or various components thereof, may be an example of means for performing various aspects of beam control techniques for a transparent repeater as described herein. For example, the communications manager 920 may include a beam indication component 925, a beam switch signal component 930, a relaying component 935, a sequence indication component 940, a wide beam component 945, a beam switch component 950, a capability indication component 955, or any combination thereof. Each of these components may communicate, directly or indirectly, with one another (e.g., via one or more buses).

The communications manager 920 may support wireless communications at a repeater device in accordance with examples as disclosed herein. The beam indication component 925 may be configured as or otherwise support a means for transmitting, to a network entity, a control message indicating a set of multiple beams of the repeater device. The beam switch signal component 930 may be configured as or otherwise support a means for receiving, from the network entity, a signal within a time slot indicating a first beam of the set of multiple beams. The relaying component 935 may be configured as or otherwise support a means for relaying, via the first beam, a data message from the network entity to a UE associated with the first beam within the time slot based on the signal.

In some examples, the sequence indication component 940 may be configured as or otherwise support a means for receiving a second control message indicating a set of multiple sequences, where each sequence of the set of multiple sequences corresponds to a different beam of the set of multiple beams, where the data message is relayed via the first beam on the second control message.

In some examples, the beam switch component 950 may be configured as or otherwise support a means for switching to the first beam of the multiple beams based on the signal including a first sequence of the set of multiple sequences that corresponds to the first beam.

In some examples, to support receiving the second control message, the sequence indication component 940 may be configured as or otherwise support a means for receiving the second control message indicating a mapping between the set of multiple sequences and a set of multiple indexes for the set of multiple beams, where the data message is relayed via the first beam based on the mapping.

In some examples, the beam switch component 950 may be configured as or otherwise support a means for switching to the first beam corresponding to a beam index mapped to a first sequence of the multiple sequences based on the signal including the first sequence and the second control message indicating the mapping.

In some examples, the wide beam component 945 may be configured as or otherwise support a means for relaying, from the network entity to the UE via a wide beam, a downlink control information message scheduling the data message.

In some examples, the downlink control information message is frequency domain multiplexed with the signal.

In some examples, the beam switch component 950 may be configured as or otherwise support a means for communicating one or more messages using a second beam of the set of multiple beams. In some examples, the beam switch component 950 may be configured as or otherwise support a means for switching from the second beam to the first beam based on the signal.

In some examples, to support relaying the data message, the relaying component 935 may be configured as or otherwise support a means for receiving the data message from the network entity. In some examples, to support relaying the data message, the relaying component 935 may be configured as or otherwise support a means for transmitting the data message to the UE after a beam switch time gap.

In some examples, the signal may include a preamble sequence associated with the first beam of the set of multiple beams, where the data message is transmitted using the first beam based on the preamble sequence.

the signal is included in a downlink control information message scheduling the data message.

In some examples, the control message may indicate a mapping between a set of multiple UEs and the set of multiple beams, where the signal is based on the mapping.

In some examples, to support transmitting the control message, the capability indication component 955 may be configured as or otherwise support a means for transmitting the control message indicating a capability of the repeater device to relay signaling with low latency.

In some examples, the capability of the repeater device includes a quantity of beams supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

In some examples, the sequence indication component 940 may be configured as or otherwise support a means for receiving a second control message indicating a mapping between a set of multiple sequences and a set of multiple UE identifiers for a set of multiple UEs. In some examples, to support relaying the data message, the relaying component 935 may be configured as or otherwise support a means for transmitting the data message via the first beam serving the UE with a UE identifier mapped to a sequence included with the signal.

In some examples, the signal includes a sequence corresponding to the first beam, where the sequence is a Zadoff-Chu sequence, a Walsh code, a Gold sequence, or any combination thereof.

In some examples, the beam indication component 925 may be configured as or otherwise support a means for transmitting a message indicating that a quantity of supported beams at the repeater device exceeds a quantity of configured beams at the repeater device, where the second control message is received in response to the message.

Figure 10:
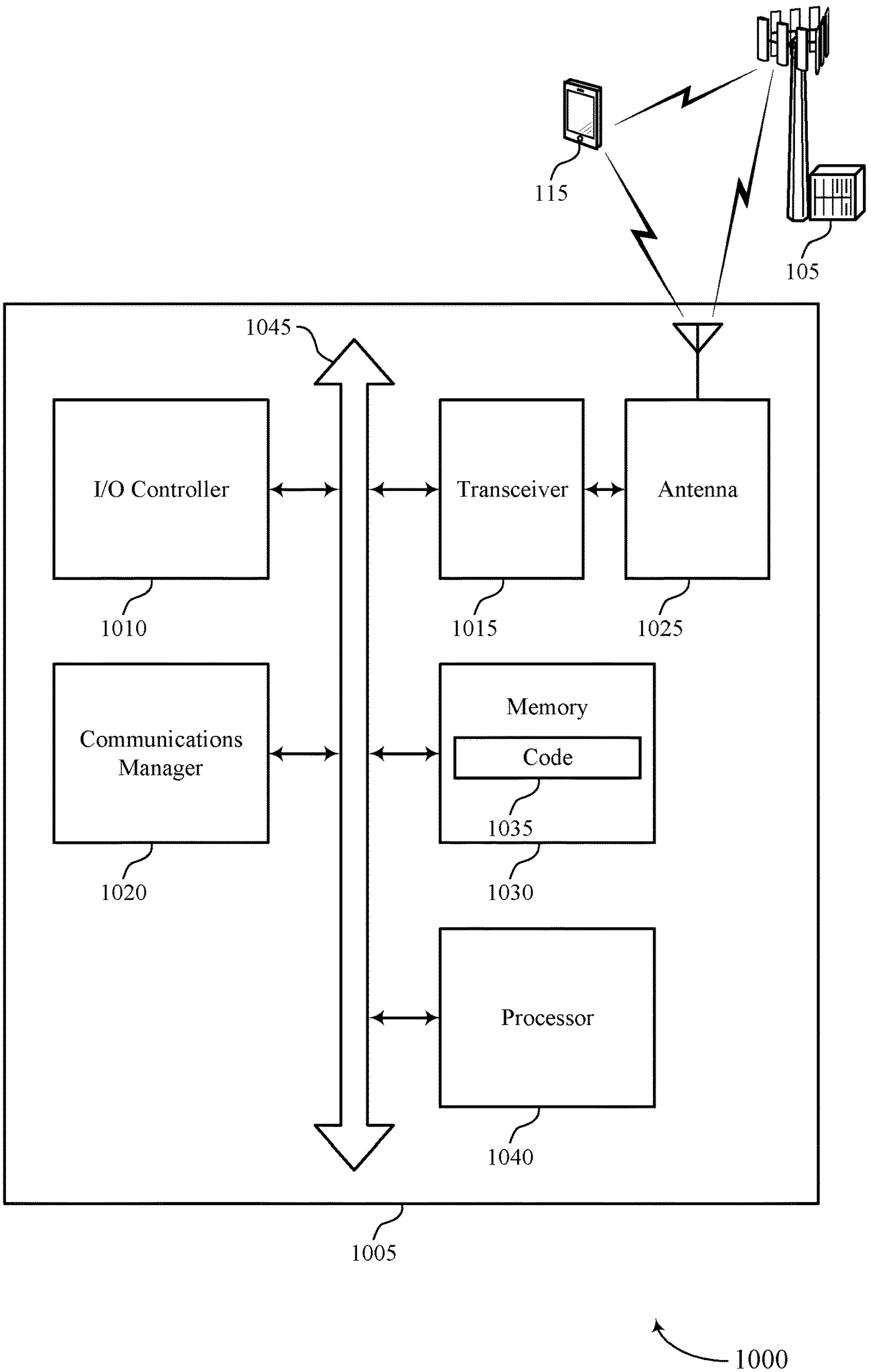
FIG. 10 shows a diagram of a system including a device that supports beam control techniques for a transparent repeater in accordance with one or more aspects of the present disclosure.

FIG. 10 shows a diagram of a system 1000 including a device 1005 that supports beam control techniques for a transparent repeater in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam control techniques for a transparent repeater). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a repeater device in accordance with examples as disclosed herein. For example, the communications manager 1020 may be configured as or otherwise support a means for transmitting, to a network entity, a control message indicating a set of multiple beams of the repeater device. The communications manager 1020 may be configured as or otherwise support a means for receiving, from the network entity, a signal within a time slot indicating a first beam of the set of multiple beams. The communications manager 1020 may be configured as or otherwise support a means for relaying, via the first beam, a data message from the network entity to a UE associated with the first beam within the time slot based on the signal.

By including or configuring the communications manager 1020 in accordance with examples as described herein, the device 1005 may support techniques for more efficient utilization of communication resources by reducing latency for systems employing repeater devices while improving beamforming gain for signaling from repeater devices. For example, these techniques may enable a repeater device to more reliably relay low latency communications between a network entity 105 and a UE 115 by efficiently performing a fast beam switch procedure to use narrow beams.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of beam control techniques for a transparent repeater as described herein, or the processor 1040 and the memory 1030 may be otherwise configured to perform or support such operations.

Figure 11:
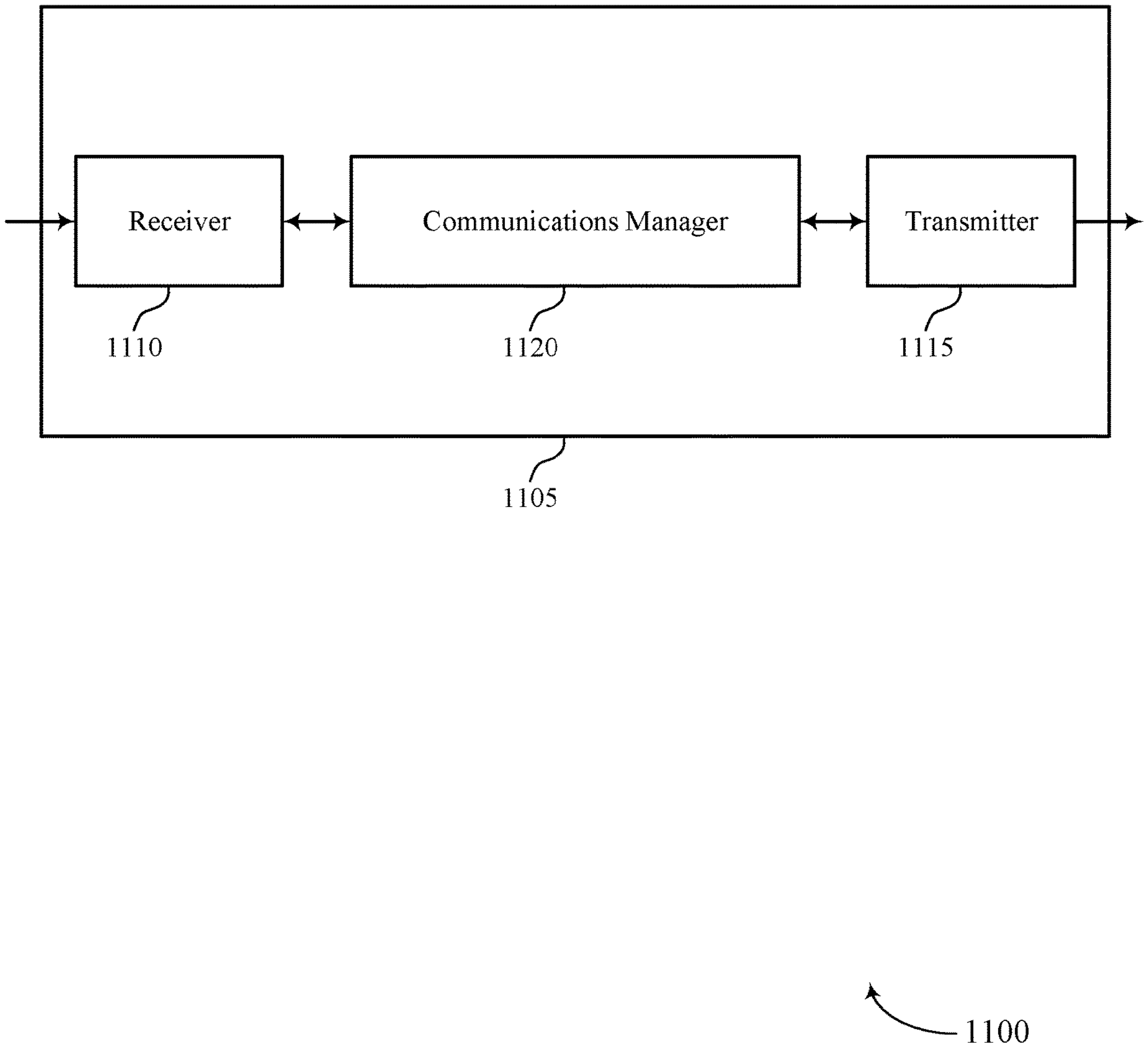
FIGS. 11 and 12 show block diagrams of devices that support beam control techniques for a transparent repeater in accordance with one or more aspects of the present disclosure.

FIG. 11 shows a block diagram 1100 of a device 1105 that supports beam control techniques for a transparent repeater in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of beam control techniques for a transparent repeater as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for receiving, from a repeater device, a control message indicating a set of multiple beams of the repeater device. The communications manager 1120 may be configured as or otherwise support a means for transmitting, to the repeater device, a signal within a time slot indicating a first beam of the set of multiple beams. The communications manager 1120 may be configured as or otherwise support a means for transmitting, to the repeater device in accordance with a beam switch time gap of the repeater device, a data message for a UE associated with the first beam within the time slot based on the signal.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources by reducing latency for systems employing repeater devices while improving beamforming gain for signaling from repeater devices. For example, these techniques may enable a network entity to more reliably transmit low latency communications to a UE 115 via a repeater device by efficiently configuring the repeater device to perform a fast beam switch procedure to use narrow beams.

Figure 12:
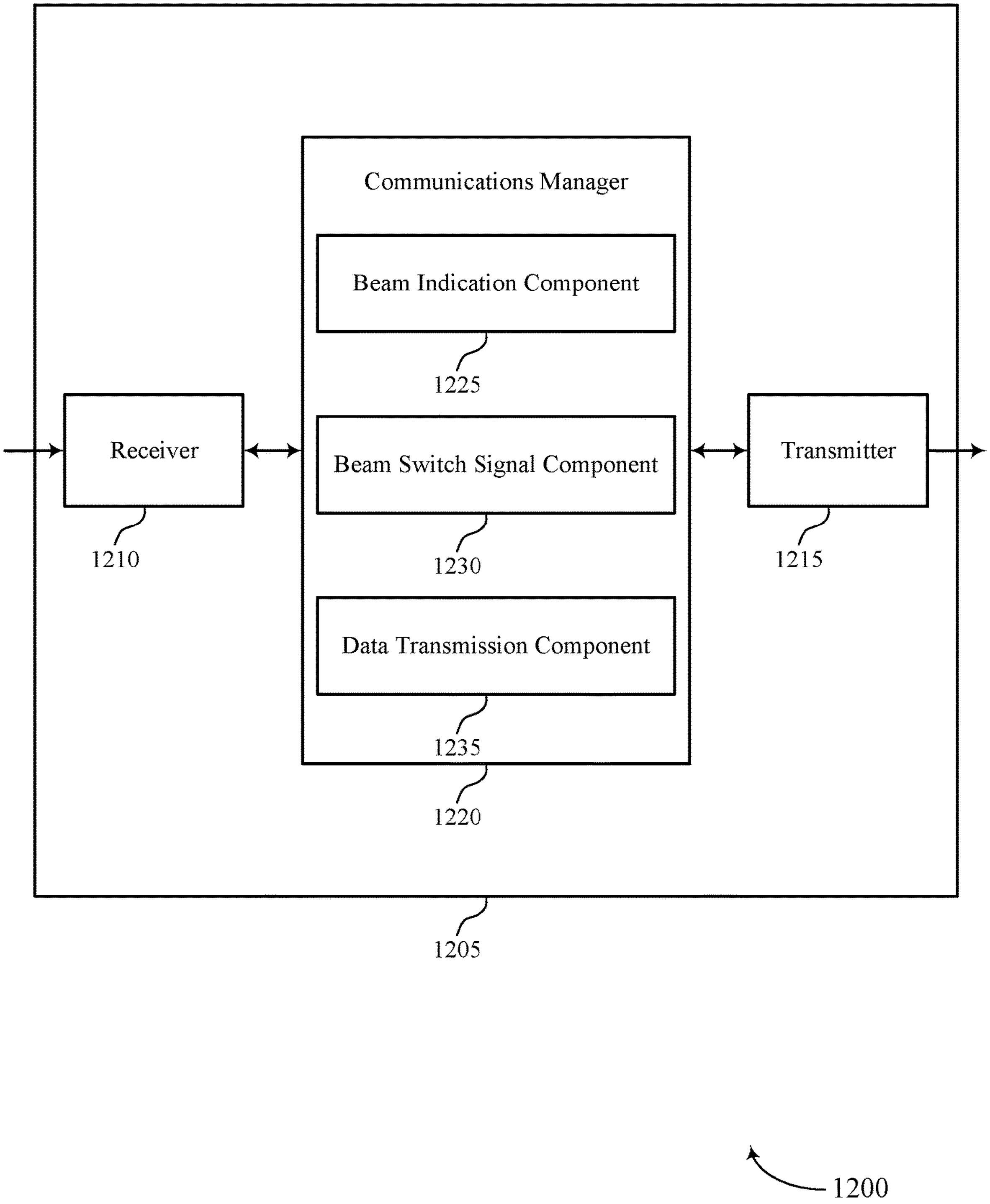

FIG. 12 shows a block diagram 1200 of a device 1205 that supports beam control techniques for a transparent repeater in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of beam control techniques for a transparent repeater as described herein. For example, the communications manager 1220 may include a beam indication component 1225, a beam switch signal component 1230, a data transmission component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The beam indication component 1225 may be configured as or otherwise support a means for receiving, from a repeater device, a control message indicating a set of multiple beams of the repeater device. The beam switch signal component 1230 may be configured as or otherwise support a means for transmitting, to the repeater device, a signal within a time slot indicating a first beam of the set of multiple beams. The data transmission component 1235 may be configured as or otherwise support a means for transmitting, to the repeater device in accordance with a beam switch time gap of the repeater device, a data message for a UE associated with the first beam within the time slot based on the signal.

Figure 13:
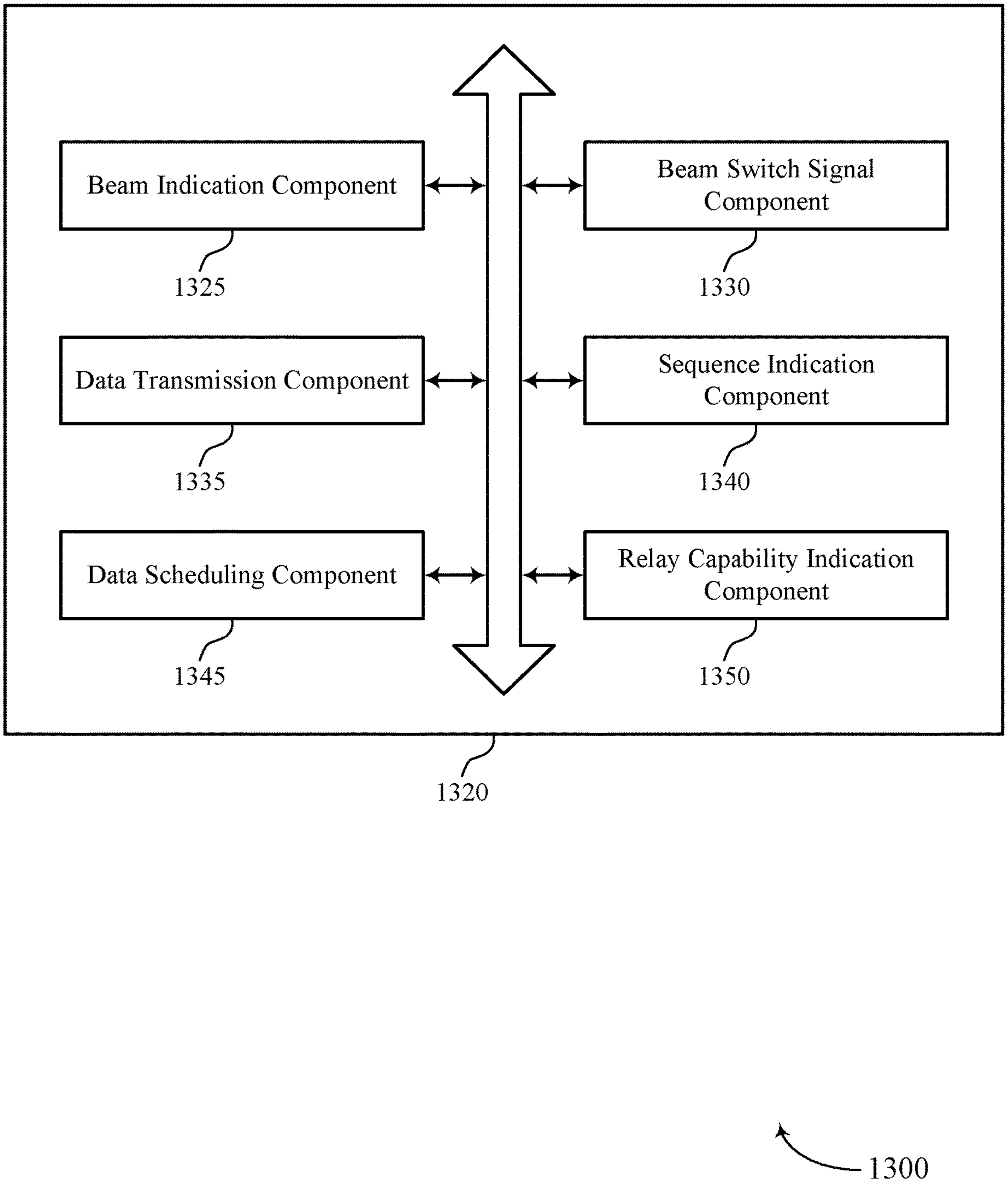
FIG. 13 shows a block diagram of a communications manager that supports beam control techniques for a transparent repeater in accordance with one or more aspects of the present disclosure.

FIG. 13 shows a block diagram 1300 of a communications manager 1320 that supports beam control techniques for a transparent repeater in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of beam control techniques for a transparent repeater as described herein. For example, the communications manager 1320 may include a beam indication component 1325, a beam switch signal component 1330, a data transmission component 1335, a sequence indication component 1340, a data scheduling component 1345, a relay capability indication component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The beam indication component 1325 may be configured as or otherwise support a means for receiving, from a repeater device, a control message indicating a set of multiple beams of the repeater device. The beam switch signal component 1330 may be configured as or otherwise support a means for transmitting, to the repeater device, a signal within a time slot indicating a first beam of the set of multiple beams. The data transmission component 1335 may be configured as or otherwise support a means for transmitting, to the repeater device in accordance with a beam switch time gap of the repeater device, a data message for a UE associated with the first beam within the time slot based on the signal.

In some examples, the sequence indication component 1340 may be configured as or otherwise support a means for transmitting a second control message indicating a set of multiple sequences, where each sequence of the set of multiple sequences corresponds to a different beam of the set of multiple beams, where a sequence of the multiple sequences included with the signal corresponds to the first beam of the multiple beams.

In some examples, the signal includes a first sequence of the set of multiple sequences, and the first sequence corresponds to the first beam.

In some examples, to support transmitting the second control message, the sequence indication component 1340 may be configured as or otherwise support a means for transmitting the second control message indicating a mapping between the set of multiple sequences and a set of multiple indexes for the set of multiple beams, and a sequence of the multiple sequences included with the signal corresponds to a beam index for the first beam.

In some examples, the data scheduling component 1345 may be configured as or otherwise support a means for transmitting, to the repeater device, a downlink control information message scheduling the data message.

In some examples, the downlink control information message is frequency domain multiplexed with the signal.

In some examples, the signal includes a preamble sequence associated with the first beam of the set of multiple beams, where the data message is transmitted using the first beam based on the preamble sequence.

In some examples, the signal is included in a downlink control information message scheduling the data message.

In some examples, to support receiving the control message, the beam indication component 1325 may be configured as or otherwise support a means for receiving the control message indicating a mapping between a set of multiple UEs and the set of multiple beams, where the signal is based on the mapping.

In some examples, to support receiving the control message, the relay capability indication component 1350 may be configured as or otherwise support a means for receiving the control message indicating a capability of the repeater device to relay signaling with low latency.

In some examples, the capability of the repeater device includes a quantity of beam supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

In some examples, the sequence indication component 1340 may be configured as or otherwise support a means for transmitting a second control message indicating a mapping between a set of multiple sequences and a set of multiple UE identifiers for a set of multiple UEs, where a UE identifier of the UE corresponds to the first beam based on the mapping.

In some examples, the beam indication component 1325 may be configured as or otherwise support a means for receiving a message indicating that a quantity of supported beams at the repeater device exceeds a quantity of configured beams at the repeater device, where the second control message is received in response to the message.

Figure 14:
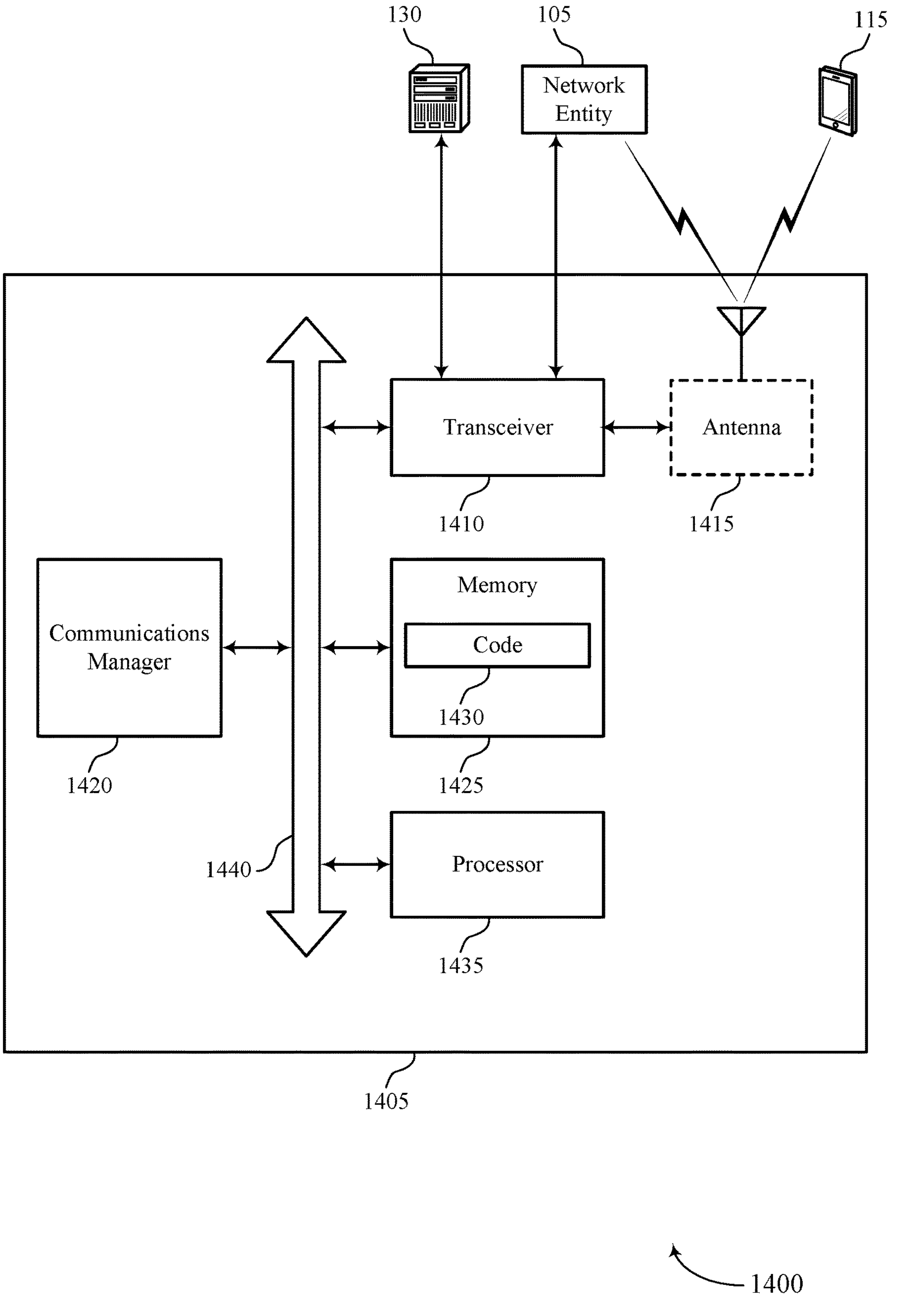
FIG. 14 shows a diagram of a system including a device that supports beam control techniques for a transparent repeater in accordance with one or more aspects of the present disclosure.

FIG. 14 shows a diagram of a system 1400 including a device 1405 that supports beam control techniques for a transparent repeater in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting beam control techniques for a transparent repeater). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for receiving, from a repeater device, a control message indicating a set of multiple beams of the repeater device. The communications manager 1420 may be configured as or otherwise support a means for transmitting, to the repeater device, a signal within a time slot indicating a first beam of the set of multiple beams. The communications manager 1420 may be configured as or otherwise support a means for transmitting, to the repeater device in accordance with a beam switch time gap of the repeater device, a data message for a UE associated with the first beam within the time slot based on the signal.

By including or configuring the communications manager 1420 in accordance with examples as described herein, the device 1405 may support techniques for more efficient utilization of communication resources by reducing latency for systems employing repeater devices while improving beamforming gain for signaling from repeater devices. For example, these techniques may enable a network entity to more reliably transmit low latency communications to a UE 115 via a repeater device by efficiently configuring the repeater device to perform a fast beam switch procedure to use narrow beams.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of beam control techniques for a transparent repeater as described herein, or the processor 1435 and the memory 1425 may be otherwise configured to perform or support such operations.

Figure 15:
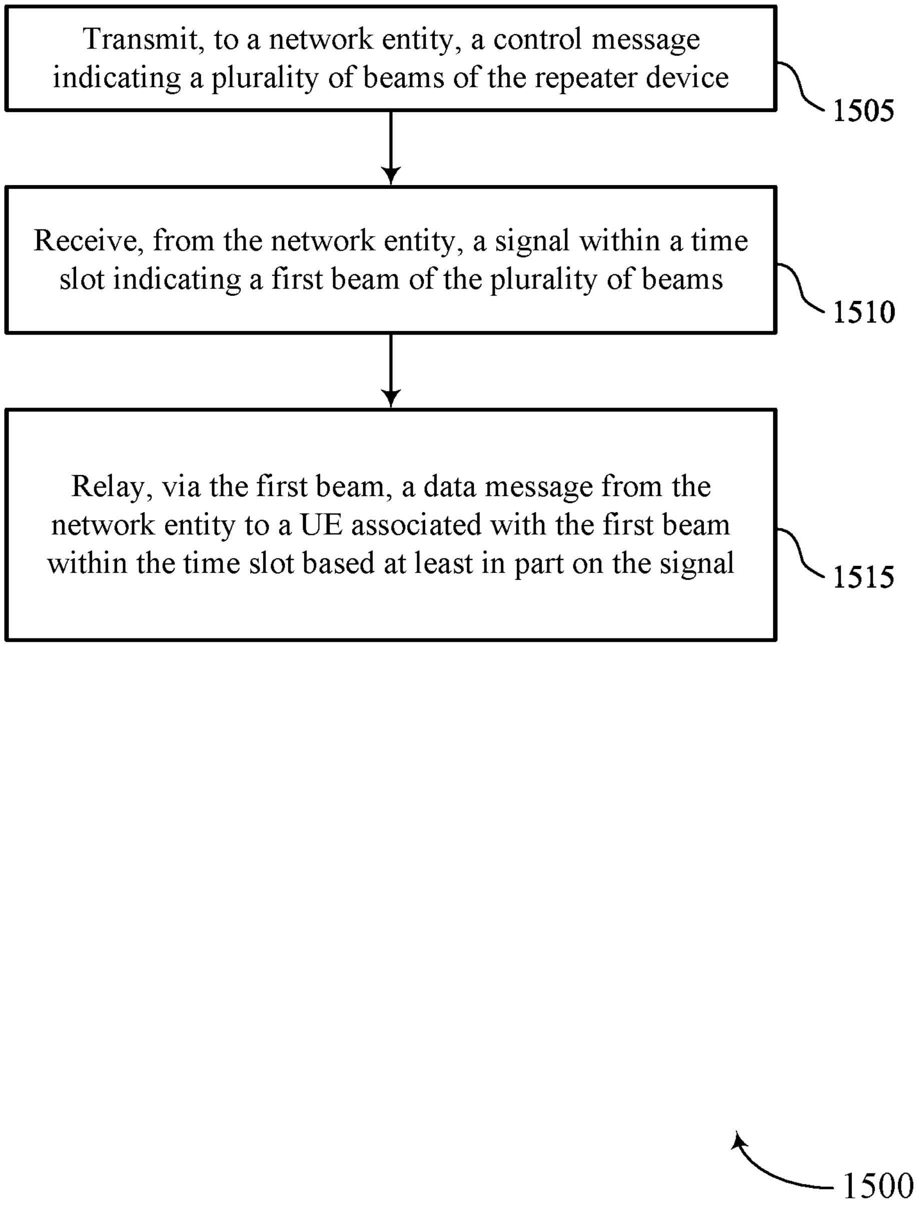
FIGS. 15 through 18 show flowcharts illustrating methods that support beam control techniques for a transparent repeater in accordance with one or more aspects of the present disclosure.

FIG. 15 shows a flowchart illustrating a method 1500 that supports beam control techniques for a transparent repeater in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a control message indicating a set of multiple beams of the repeater device. The operations of 1505 may be performed in accordance with examples as disclosed herein. In some examples, aspects of the operations of 1505 may be performed by a beam indication component 925 as described with reference to FIG. 9.

At 1510, the method may include receiving, from the network entity, a signal within a time slot indicating a first beam of the set of multiple beams. The operations of 1510 may be performed in accordance with examples as disclosed herein. In some examples, aspects of the operations of 1510 may be performed by a beam switch signal component 930 as described with reference to FIG. 9.

At 1515, the method may include relaying, via the first beam, a data message from the network entity to a UE associated with the first beam within the time slot based on the signal. The operations of 1515 may be performed in accordance with examples as disclosed herein. In some examples, aspects of the operations of 1515 may be performed by a relaying component 935 as described with reference to FIG. 9.

Figure 16:
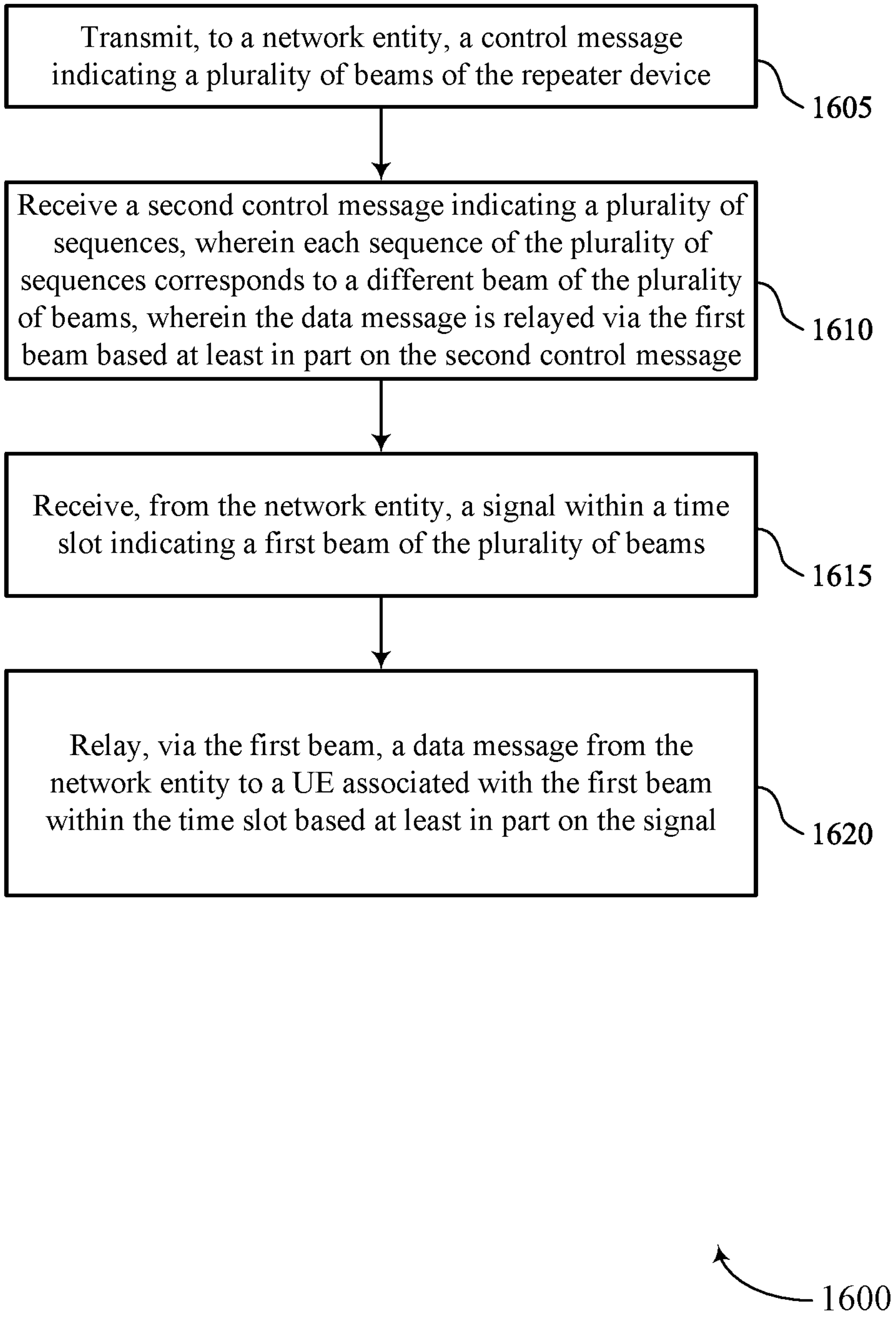

FIG. 16 shows a flowchart illustrating a method 1600 that supports beam control techniques for a transparent repeater in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a control message indicating a set of multiple beams of the repeater device. The operations of 1605 may be performed in accordance with examples as disclosed herein. In some examples, aspects of the operations of 1605 may be performed by a beam indication component 925 as described with reference to FIG. 9.

At 1610, the method may include receiving a second control message indicating a set of multiple sequences, where each sequence of the set of multiple sequences corresponds to a different beam of the set of multiple beams, where the data message is relayed via the first beam based on the second control message. The operations of 1610 may be performed in accordance with examples as disclosed herein. In some examples, aspects of the operations of 1610 may be performed by a sequence indication component 940 as described with reference to FIG. 9.

At 1615, the method may include receiving, from the network entity, a signal within a time slot indicating a first beam of the set of multiple beams. The operations of 1615 may be performed in accordance with examples as disclosed herein. In some examples, aspects of the operations of 1615 may be performed by a beam switch signal component 930 as described with reference to FIG. 9.

At 1620, the method may include relaying, via the first beam, a data message from the network entity to a UE associated with the first beam within the time slot based on the signal. The operations of 1620 may be performed in accordance with examples as disclosed herein. In some examples, aspects of the operations of 1620 may be performed by a relaying component 935 as described with reference to FIG. 9.

Figure 17:
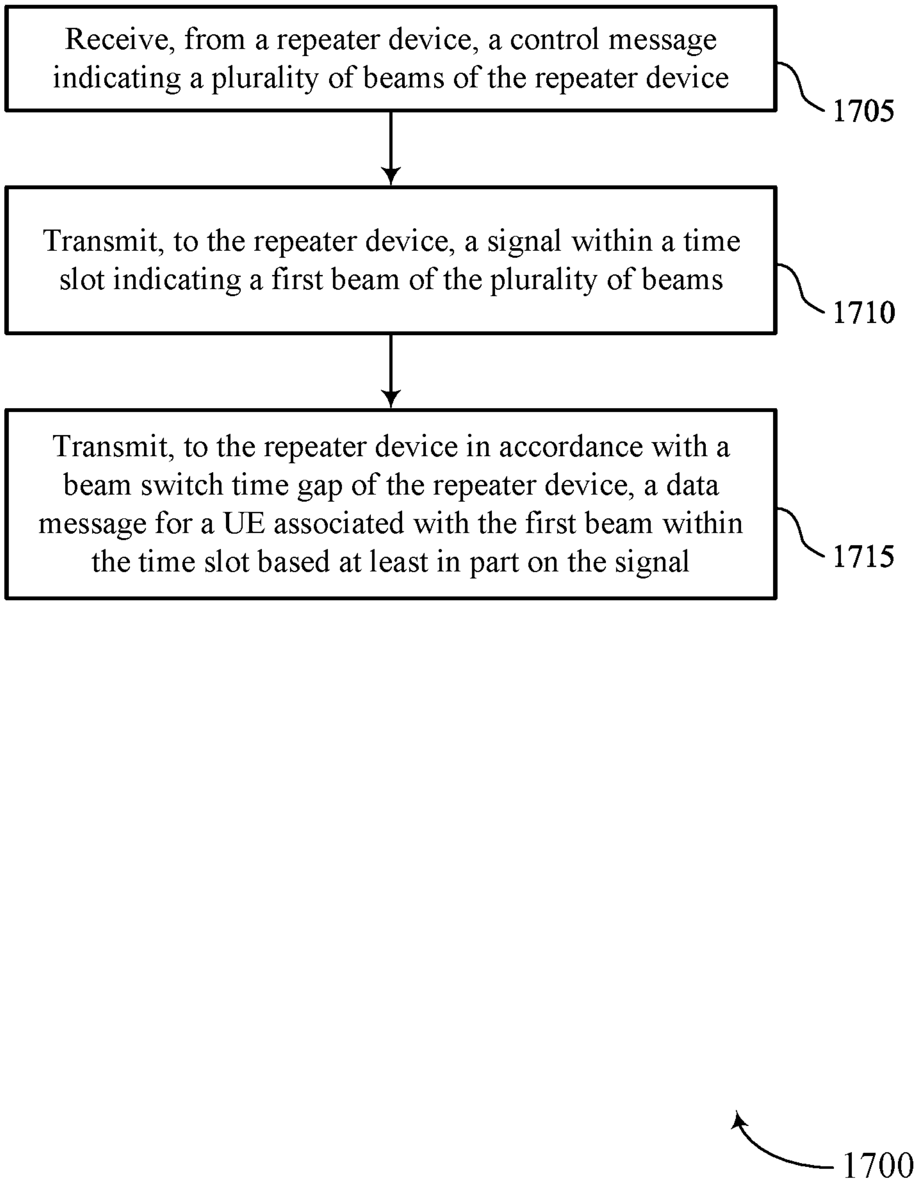

FIG. 17 shows a flowchart illustrating a method 1700 that supports beam control techniques for a transparent repeater in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a repeater device, a control message indicating a set of multiple beams of the repeater device. The operations of 1705 may be performed in accordance with examples as disclosed herein. In some examples, aspects of the operations of 1705 may be performed by a beam indication component 1325 as described with reference to FIG. 13.

At 1710, the method may include transmitting, to the repeater device, a signal within a time slot indicating a first beam of the set of multiple beams. The operations of 1710 may be performed in accordance with examples as disclosed herein. In some examples, aspects of the operations of 1710 may be performed by a beam switch signal component 1330 as described with reference to FIG. 13.

At 1715, the method may include transmitting, to the repeater device in accordance with a beam switch time gap of the repeater device, a data message for a UE associated with the first beam within the time slot based on the signal. The operations of 1715 may be performed in accordance with examples as disclosed herein. In some examples, aspects of the operations of 1715 may be performed by a data transmission component 1335 as described with reference to FIG. 13.

Figure 18:
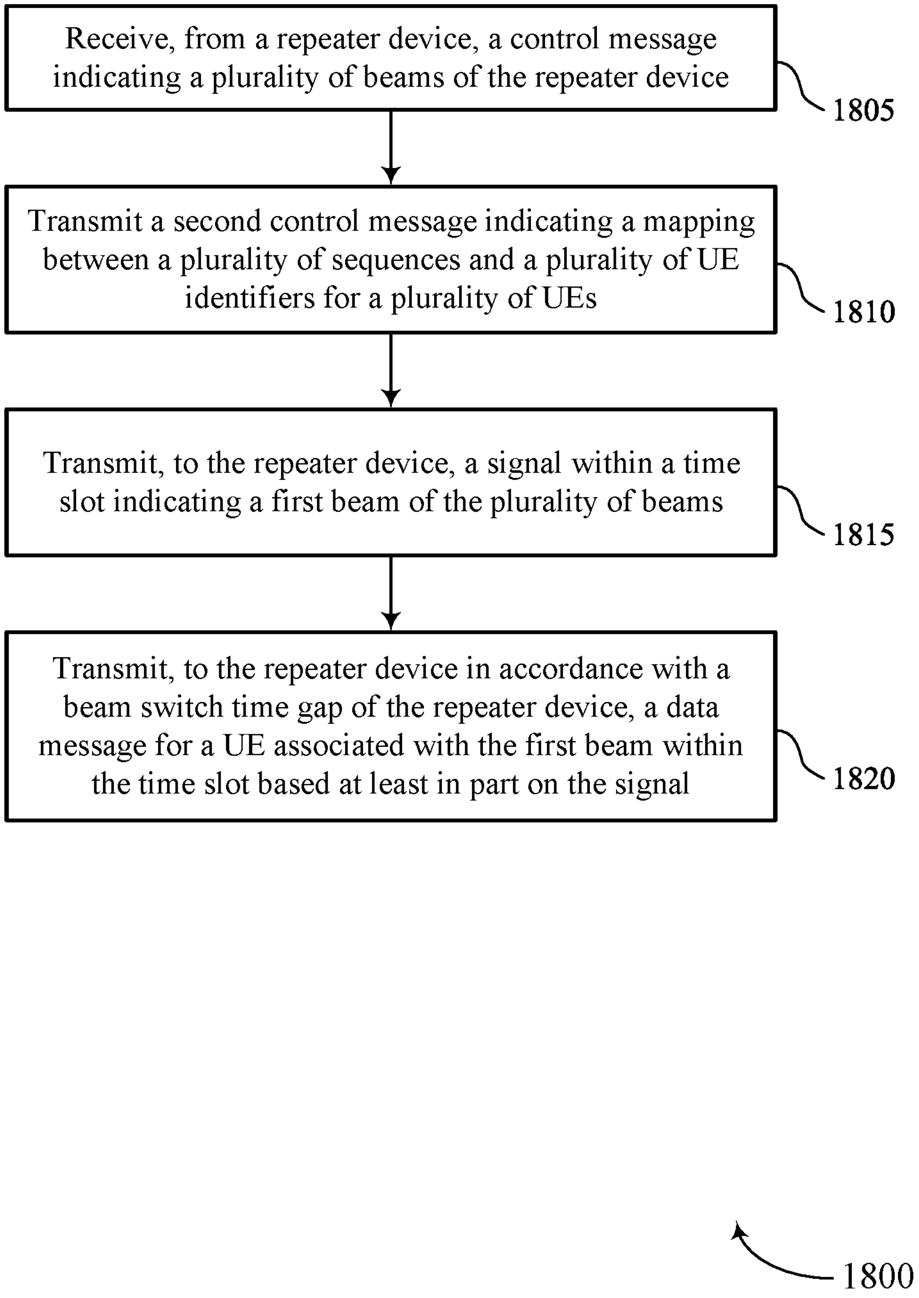

FIG. 18 shows a flowchart illustrating a method 1800 that supports beam control techniques for a transparent repeater in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a repeater device, a control message indicating a set of multiple beams of the repeater device. The operations of 1805 may be performed in accordance with examples as disclosed herein. In some examples, aspects of the operations of 1805 may be performed by a beam indication component 1325 as described with reference to FIG. 13.

At 1810, the method may include transmitting a second control message indicating a mapping between a set of multiple sequences and a set of multiple UE identifiers for a set of multiple UEs. The operations of 1810 may be performed in accordance with examples as disclosed herein. In some examples, aspects of the operations of 1810 may be performed by a sequence indication component 1340 as described with reference to FIG. 13.

At 1815, the method may include transmitting, to the repeater device, a signal within a time slot indicating a first beam of the set of multiple beams. The operations of 1815 may be performed in accordance with examples as disclosed herein. In some examples, aspects of the operations of 1815 may be performed by a beam switch signal component 1330 as described with reference to FIG. 13.

At 1820, the method may include transmitting, to the repeater device in accordance with a beam switch time gap of the repeater device, a data message for a UE associated with the first beam within the time slot based on the signal. The operations of 1820 may be performed in accordance with examples as disclosed herein. In some examples, aspects of the operations of 1820 may be performed by a data transmission component 1335 as described with reference to FIG. 13.

The following provides an overview of aspects of the present disclosure:

Aspect 1: A method for wireless communications at a repeater device, comprising: transmitting, to a network entity, a control message indicating a plurality of beams of the repeater device; receiving, from the network entity, a signal within a time slot indicating a first beam of the plurality of beams; and relaying, via the first beam, a data message from the network entity to a UE associated with the first beam within the time slot based at least in part on the signal.

Aspect 2: The method of aspect 1, further comprising: receiving a second control message indicating a plurality of sequences, wherein each sequence of the plurality of sequences corresponds to a different beam of the plurality of beams, wherein the data message is relayed via the first beam based at least in part on the second control message.

Aspect 3: The method of aspect 2, further comprising: switching to the first beam of the plurality of beams based at least in part on the signal comprising a first sequence of the plurality of sequences, wherein the first sequence corresponds to the first beam.

Aspect 4: The method of any of aspects 2 through 3, wherein receiving the second control message comprises: receiving the second control message indicating a mapping between the plurality of sequences and a plurality of indexes for the plurality of beams, wherein the data message is relayed via the first beam based at least in part on the mapping.

Aspect 5: The method of aspect 4, further comprising: switching to the first beam corresponding to a beam index mapped to a first sequence of the plurality of sequences based at least in part on the signal including the first sequence and the second control message indicating the mapping.

Aspect 6: The method of any of aspects 1 through 5, further comprising: relaying, from the network entity to the UE via a wide beam, a downlink control information message scheduling the data message.

Aspect 7: The method of aspect 6, wherein the downlink control information message is frequency domain multiplexed with the signal.

Aspect 8: The method of any of aspects 1 through 7, further comprising: communicating one or more messages using a second beam of the plurality of beams; and switching from the second beam to the first beam based at least in part on the signal.

Aspect 9: The method of any of aspects 1 through 8, wherein relaying the data message comprises: receiving the data message from the network entity; and transmitting the data message to the UE after a beam switch time gap.

Aspect 10: The method of any of aspects 1 through 9, wherein the signal includes a preamble sequence associated with the first beam of the plurality of beams, wherein the data message is transmitted using the first beam based at least in part on the preamble sequence.

Aspect 11: The method of aspect 10, wherein the signal is included in a downlink control information message scheduling the data message.

Aspect 12: The method of any of aspects 1 through 11, wherein the control message indicates a mapping between a plurality of UEs and the plurality of beams, wherein the signal is based at least in part on the mapping.

Aspect 13: The method of any of aspects 1 through 12, wherein the control message indicates a capability of the repeater device to relay signaling with low latency Aspect 14: The method of aspect 13, wherein the capability of the repeater device includes a quantity of beams supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

Aspect 15: The method of any of aspects 1 through 14, further comprising: receiving a second control message indicating a mapping between a plurality of sequences and a plurality of UE identifiers for a plurality of UEs; and transmitting the data message via the first beam serving the UE with a UE identifier mapped to a sequence included with the signal Aspect 16: The method of aspect 15, further comprising: transmitting a message indicating that a quantity of supported beams at the repeater device exceeds a quantity of configured beams at the repeater device, wherein the second control message is received in response to the message.

Aspect 17: The method of any of aspects 1 through 16, wherein the signal includes a sequence corresponding to the first beam, wherein the sequence is a Zadoff-Chu sequence, a Walsh code, a Gold sequence, or any combination thereof.

Aspect 18: A method for wireless communications at a network entity, comprising: receiving, from a repeater device, a control message indicating a plurality of beams of the repeater device; transmitting, to the repeater device, a signal within a time slot indicating a first beam of the plurality of beams; and transmitting, to the repeater device in accordance with a beam switch time gap of the repeater device, a data message for a UE associated with the first beam within the time slot based at least in part on the signal.

Aspect 19: The method of aspect 18, further comprising: transmitting a second control message indicating a plurality of sequences, wherein each sequence of the plurality of sequences corresponds to a different beam of the plurality of beams, wherein a sequence of the plurality of sequences included with the signal corresponds to the first beam of the plurality of beams.

Aspect 20: The method of aspect 19, wherein the signal comprises a first sequence of the plurality of sequences, and the first sequence corresponds to the first beam.

Aspect 21: The method of any of aspects 19 through 20, wherein transmitting the second control message comprises: transmitting the second control message indicating a mapping between the plurality of sequences and a plurality of indexes for the plurality of beams, wherein a sequence of the plurality of sequences included with the signal corresponds to a beam index for the first beam.

Aspect 22: The method of any of aspects 18 through 21, further comprising: transmitting, to the repeater device, a downlink control information message scheduling the data message.

Aspect 23: The method of aspect 22, wherein the downlink control information message is frequency domain multiplexed with the signal.

Aspect 24: The method of any of aspects 18 through 23, wherein the signal includes a preamble sequence associated with the first beam of the plurality of beams, wherein the data message is transmitted using the first beam based at least in part on the preamble sequence.

Aspect 25: The method of aspect 24, wherein the signal is included in a downlink control information message scheduling the data message.

Aspect 26: The method of any of aspects 18 through 25, wherein the control message indicates a mapping between a plurality of UEs and the plurality of beams, wherein the signal is based at least in part on the mapping.

Aspect 27: The method of any of aspects 18 through 26, wherein the control message indicates a capability of the repeater device to relay signaling with low latency.

Aspect 28: The method of aspect 27, wherein the capability of the repeater device includes a quantity of beam supported by the repeater device for transmission or reception, a capability to transmit using multiple beams simultaneously, a quantity of beams supported for simultaneous transmission, a capability to support preamble relaying, a time gap between the preamble and transmission of the data message, or any combination thereof.

Aspect 29: The method of any of aspects 18 through 28, further comprising: transmitting a second control message indicating a mapping between a plurality of sequences and a plurality of UE identifiers for a plurality of UEs, wherein a UE identifier of the UE corresponds to the first beam based at least in part on the mapping.

Aspect 30: The method of aspect 29, further comprising: receiving a message indicating that a quantity of supported beams at the repeater device exceeds a quantity of configured beams at the repeater device, wherein the second control message is received in response to the message.

Aspect 31: An apparatus for wireless communications at a repeater device, comprising a processor; memory coupled with the processor; and instructions stored in the memory and executable by the processor to cause the apparatus to perform a method of any of aspects 1 through 16.

Aspect 32: An apparatus for wireless communications at a repeater device, comprising at least one means for performing a method of any of aspects 1 through 16.

Aspect 33: A non-transitory computer-readable medium storing code for wireless communications at a repeater device, the code comprising instructions executable by a processor to perform a method of any of aspects 1 through 16.

Aspect 34: An apparatus for wireless communications at a network entity, comprising a processor; memory coupled with the processor; and instructions stored in the memory and executable by the processor to cause the apparatus to perform a method of any of aspects 18 through 30.

Aspect 35: An apparatus for wireless communications at a network entity, comprising at least one means for performing a method of any of aspects 18 through 30.

Aspect 36: A non-transitory computer-readable medium storing code for wireless communications at a network entity, the code comprising instructions executable by a processor to perform a method of any of aspects 18 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A repeater device for wireless communications, comprising:

one or more processors;

one or more memories coupled with the one or more processors; and instructions stored in the one or more memories and executable by the one or more processors to cause the repeater device to:

transmit, to a network entity, a control message indicating a plurality of narrow beams of the repeater device;

receive, from the network entity during a time slot, a signal that corresponds to a first narrow beam of the plurality of narrow beams in accordance with the control message, wherein the signal is frequency division multiplexed with one or more downlink control information messages;

relay, from the network entity to a user equipment (UE) via a wide beam, a first downlink control information message of the one or more downlink control information messages that schedules the UE for a data message; and relay, via the first narrow beam, the data message from the network entity to the UE within the time slot based at least in part on the signal corresponding to the first narrow beam.

2. The repeater device of claim 1, wherein the instructions are further executable by the one or more processors to cause the repeater device to:

receive a second control message indicating a plurality of sequences, wherein each sequence of the plurality of sequences corresponds to a different narrow beam of the plurality of narrow beams, wherein the data message is relayed via the first narrow beam based at least in part on the second control message.

3. The repeater device of claim 2, wherein the instructions are further executable by the one or more processors to cause the repeater device to:

switch to the first narrow beam of the plurality of narrow beams based at least in part on the signal comprising a first sequence, of the plurality of sequences, that corresponds to the first narrow beam.

4. The repeater device of claim 2, wherein the instructions to receive the second control message are executable by the one or more processors to cause the repeater device to:

receive the second control message indicating a mapping between the plurality of sequences and a plurality of indexes for the plurality of narrow beams, wherein the data message is relayed via the first narrow beam based at least in part on the mapping.

5. The repeater device of claim 4, wherein the instructions are further executable by the one or more processors to cause the repeater device to:

switch to the first narrow beam corresponding to a beam index mapped to a first sequence, of the plurality of sequences, based at least in part on the signal including the first sequence and the second control message indicating the mapping.

6. The repeater device of claim 1, wherein the instructions are further executable by the one or more processors to cause the repeater device to:

communicate one or more messages using a second narrow beam of the plurality of narrow beams; and switch from the second narrow beam to the first narrow beam based at least in part on the signal.

7. The repeater device of claim 1, wherein the instructions to relay the data message are executable by the one or more processors to cause the repeater device to:

receive the data message from the network entity; and transmit the data message to the UE after a beam switch time gap.

8. The repeater device of claim 1, wherein the control message indicates a mapping between a plurality of UEs and the plurality of narrow beams, wherein the signal corresponds to the first narrow beam in accordance with the mapping.

9. The repeater device of claim 1, wherein the control message indicates a capability of the repeater device to relay signaling with low latency.

10. The repeater device of claim 9, wherein the capability of the repeater device includes a quantity of beams supported by the repeater device for transmission or reception, a capability to transmit using multiple beams simultaneously, a quantity of beams supported for simultaneous transmission or any combination thereof.

11. The repeater device of claim 1, wherein the instructions are further executable by the one or more processors to cause the repeater device to:

receive a second control message indicating a mapping between a plurality of sequences and a plurality of UE identifiers for a plurality of UEs; and wherein the instructions to relay the data message are further executable by the one or more processors to cause the repeater device to:

transmit the data message via the first narrow beam serving the UE with a UE identifier mapped to a sequence included with the signal.

12. The repeater device of claim 11, wherein the instructions are further executable by the one or more processors to cause the repeater device to:

transmit a message indicating that a quantity of supported beams at the repeater device exceeds a quantity of configured beams at the repeater device, wherein the second control message is received in response to the message.

13. The repeater device of claim 1, wherein the signal includes a sequence corresponding to the first narrow beam, wherein the sequence is a Zadoff-Chu sequence, a Walsh code, a Gold sequence, or any combination thereof.

14. A method for wireless communications at a repeater device, comprising:

transmitting, to a network entity, a control message indicating a plurality of narrow beams of the repeater device;

receiving, from the network entity during a time slot, a signal that corresponds to a first narrow beam of the plurality of narrow beams in accordance with the control message, wherein the signal is frequency division multiplexed with one or more downlink control information messages;

relaying, from the network entity to a user equipment (UE) via a wide beam, a first downlink control information message of the one or more downlink control information messages that schedules the UE for a data message; and relaying, via the first narrow beam, the data message from the network entity to the UE within the time slot based at least in part on the signal corresponding to the first narrow beam.

15. The method of claim 14, further comprising:

communicating one or more messages using a second narrow beam of the plurality of narrow beams; and switching from the second narrow beam to the first narrow beam based at least in part on the signal.

16. The method of claim 14, wherein the control message indicates a mapping between a plurality of UEs and the plurality of narrow beams, wherein the signal is based at least in part on the mapping.

17. The method of claim 14, wherein the signal includes a sequence corresponding to the first narrow beam, wherein the sequence is a Zadoff-Chu sequence, a Walsh code, a Gold sequence, or any combination thereof.

18. A repeater device, comprising:

means for transmitting, to a network entity, a control message indicating a plurality of narrow beams of the repeater device;

means for receiving, from the network entity during a time slot, a signal that corresponds to a first narrow beam of the plurality of narrow beams in accordance with the control message, wherein the signal is frequency division multiplexed with one or more downlink control information messages;

means for relaying, from the network entity to a user equipment (UE) via a wide beam, a first downlink control information message of the one or more downlink control information messages that schedules the UE for a data message; and means for relaying, via the first narrow beam, the data message from the network entity to the UE within the time slot based at least in part on the signal corresponding to the first narrow beam.

19. The repeater device of claim 18, further comprising:

means for communicating one or more messages using a second narrow beam of the plurality of narrow beams; and means for switching from the second narrow beam to the first narrow beam based at least in part on the signal.

20. The repeater device of claim 18, wherein the control message indicates a mapping between a plurality of UEs and the plurality of narrow beams, wherein the signal corresponds to the first narrow beam in accordance with the mapping.

21. The repeater device of claim 18, wherein the signal includes a sequence corresponding to the first narrow beam, wherein the sequence is a Zadoff-Chu sequence, a Walsh code, a Gold sequence, or any combination thereof.

22. A non-transitory computer-readable medium storing code for wireless communications at a repeater device, the code comprising instructions executable by one or more processors to:

transmit, to a network entity, a control message indicating a plurality of narrow beams of the repeater device;

receive, from the network entity during a time slot, a signal that corresponds to a first narrow beam of the plurality of narrow beams in accordance with the control message, wherein the signal is frequency division multiplexed with one or more downlink control information messages;

relay, from the network entity to a user equipment (UE) via a wide beam, a first downlink control information message of the one or more downlink control information messages that schedules the UE for a data message; and relay, via the first narrow beam, the data message from the network entity to the UE within the time slot based at least in part on the signal corresponding to the first narrow beam.

23. The non-transitory computer-readable medium of claim 22, wherein the instructions are further executable by the one or more processors to:

communicating one or more messages using a second narrow beam of the plurality of narrow beams; and switching from the second narrow beam to the first narrow beam based at least in part on the signal.

24. The non-transitory computer-readable medium of claim 22, wherein the control message indicates a mapping between a plurality of UEs and the plurality of narrow beams, wherein the signal corresponds to the first narrow beam in accordance with the mapping.

25. The non-transitory computer-readable medium of claim 22, wherein the signal includes a sequence corresponding to the first narrow beam, wherein the sequence is a Zadoff-Chu sequence, a Walsh code, a Gold sequence, or any combination thereof.

* * * * *